US008261214B2

(12) United States Patent
Maeda et al.

(10) Patent No.: US 8,261,214 B2
(45) Date of Patent: Sep. 4, 2012

(54) PATTERN LAYOUT CREATION METHOD, PROGRAM PRODUCT, AND SEMICONDUCTOR DEVICE MANUFACTURING METHOD

(75) Inventors: Shimon Maeda, Tokyo (JP); Masahiro Miyairi, Kanagawa (JP); Soichi Inoue, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 327 days.

(21) Appl. No.: 12/630,048

(22) Filed: Dec. 3, 2009

(65) Prior Publication Data
US 2010/0191357 A1 Jul. 29, 2010

(30) Foreign Application Priority Data
Jan. 28, 2009 (JP) ................................. 2009-017044

(51) Int. Cl.
*G06F 17/50* (2006.01)
(52) U.S. Cl. ............................... 716/55; 716/50; 716/54
(58) Field of Classification Search .................... 716/54, 716/55
See application file for complete search history.

(56) References Cited

U.S. PATENT DOCUMENTS
6,066,180 A * 5/2000 Kim et al. ........................ 716/55
6,609,245 B2 * 8/2003 Liebmann et al. ............... 716/52
6,851,103 B2 2/2005 Van Den Broeke et al.

FOREIGN PATENT DOCUMENTS
JP 2008-261922 10/2008
* cited by examiner

*Primary Examiner* — Nghia Doan
*Assistant Examiner* — Eric Lee
(74) *Attorney, Agent, or Firm* — Finnegan, Henderson, Farabow, Garrett & Dunner, L.L.P.

(57) ABSTRACT

A graph in which patterns are each regarded as nodes and nodes of patterns adjacent to each other at a first distance are connected with each other by an edge is produced, each of the patterns is classified into two types so that the two patterns corresponding to the nodes at both ends of the edge are types different to each other, a classification result is corrected by grouping the patterns in each node cluster connected by the edge or each node cluster connected via the node by the edge, and by inverting each of types of a pattern belonging to a same group as that of one pattern, out of a pair of patterns that are classified into a same type and that belong to respectively different groups adjacent to each other at a second distance, and a pattern layout diagram is created based on the corrected classification result.

9 Claims, 17 Drawing Sheets

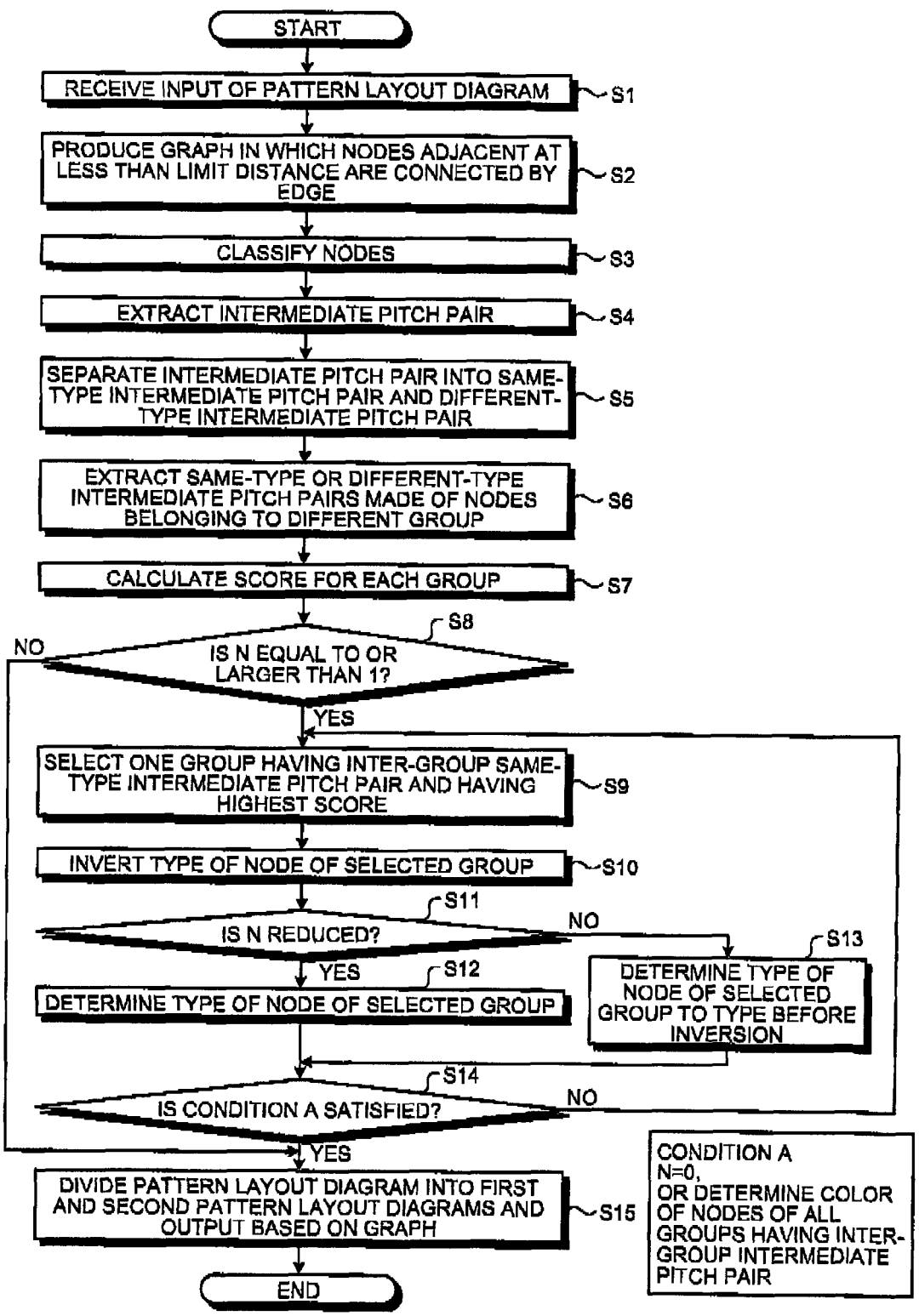

PATTERN LAYOUT DIAGRAM
BEFORE DIVISION

↔ DISTANCE LESS THAN LIMIT DISTANCE
◂┄▸ INTERMEDIATE PITCH

FIG.8A
FIRST PATTERN LAYOUT DIAGRAM    SECOND PATTERN LAYOUT DIAGRAM
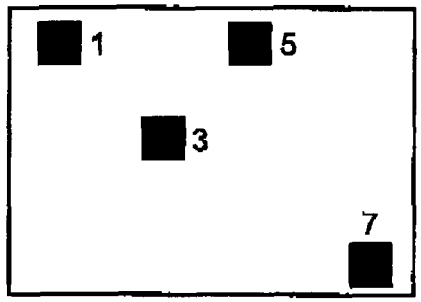 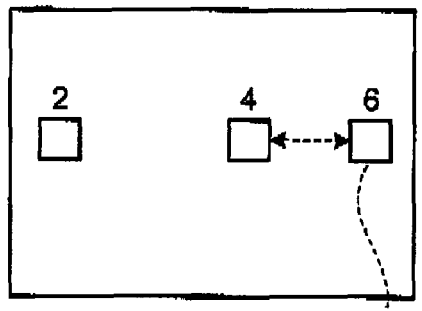
AFTER DIVISION, PAIR OF CONTACT HOLE PATTERNS ADJACENT AT INTERMEDIATE PITCH IS LEFT (PROCESS MARGIN OF THIS PART BECOMES INSUFFICIENT AND ACCURATE EXPOSURE CANNOT BE ACHIEVED)
FIG.8B
FIRST PATTERN LAYOUT DIAGRAM    SECOND PATTERN LAYOUT DIAGRAM
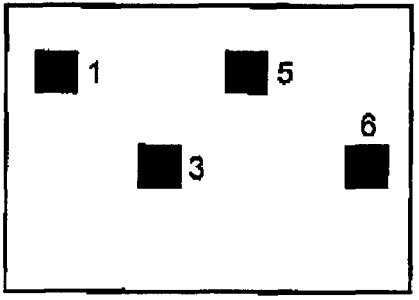 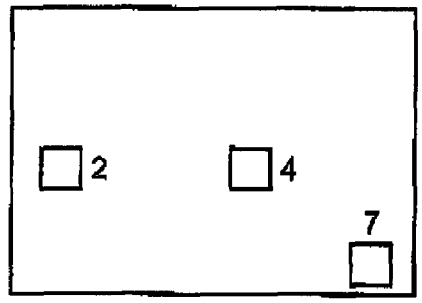

NUMBER OF INTER-GROUP SAME-TYPE PITCH PAIRS (N)=10

NUMBER OF INTER-GROUP SAME-TYPE PITCH PAIRS (N)=7

NUMBER OF INTER-GROUP SAME-TYPE PITCH PAIRS (N)=4

NUMBER OF INTER-GROUP SAME-TYPE PITCH PAIRS (N)=1

☐ SRAF

▨ MAIN PATTERN

▥ MAIN PATTERN IN WHICH EXPOSURE MARGIN IS INSUFFICIENT

DISTANCE MEASUREMENT RANGE

PATTERN LAYOUT CREATION METHOD, PROGRAM PRODUCT, AND SEMICONDUCTOR DEVICE MANUFACTURING METHOD

CROSS-REFERENCE TO RELATED APPLICATIONS

This application is based upon and claims the benefit of priority from the prior Japanese Patent Application No. 2009-017044, filed on Jan. 28, 2009; the entire contents of which are incorporated herein by reference.

BACKGROUND OF THE INVENTION

1. Field of the Invention

The present invention relates to a pattern layout creation method, a program product, and a semiconductor device manufacturing method.

2. Description of the Related Art

Downsizing of semiconductor integrated circuits greatly depends on a lithography technique. Therefore, it is generally difficult to form a device pattern having a width narrower than a lithography resolution limit. To solve such a problem, there are double patterning techniques, as a method of forming a dense device pattern exceeding a lithography resolution performance. As one of the double patterning techniques, there is a technique of forming a very fine pitch pattern on a semiconductor substrate that will otherwise be impossible to form through a single exposure by splitting one-layered photomask of an LSI pattern that has been exposed at once in a conventional photolithography process into two photomasks, and performing the exposure in twice in this state (see, for example, Japanese Patent Application Laid-open No. 2008-261922).

Meanwhile, generally, various conditions such as an exposure amount and a focal position relating to a lithography process are fluctuated, a finished shape is changed. Accordingly, to have a difference between a design pattern shape and an actually obtained pattern shape into a permissive range, it has been required to form a pattern layout that is insensitive to fluctuations of the various conditions, in other words, a pattern layout having a larger process tolerance (a process margin).

However, splitting has been conventionally performed without any regard to the process margin. Thus, there is a problem that sometimes there remains a part in which the process margin is insufficient in the split pattern layout. When there is a part in which the process margin is insufficient in a pattern layout diagram, a finished shape of that part greatly changes depending on fluctuations in various conditions. Thus, there arises a problem that it is not possible to form a highly accurate pattern.

BRIEF SUMMARY OF THE INVENTION

A pattern layout creation method according to an embodiment of the present invention comprises: producing a graph in which patterns produced based on a pattern layout diagram are each regarded as nodes and nodes of patterns adjacent to each other at a first distance are connected with each other by an edge; classifying each of the patterns produced based on the pattern layout diagram into two types so that two patterns corresponding to the nodes at both ends of the edge are types different to each other; correcting a classification result by grouping the patterns produced based on the pattern layout diagram in each node cluster connected by the edge or each node cluster connected via the node by the edge, and by inverting each of types of the pattern belonging to a same group as that of one pattern, out of a pair of patterns that are classified into a same type and that belong to respectively different groups adjacent to each other at a second distance larger than the first distance; and creating the pattern layout diagram based on the corrected classification result.

A pattern layout creation method according to an embodiment of the present invention comprises: producing a graph in which patterns produced based on a pattern layout diagram are regarded as nodes and nodes of patterns adjacent to each other at a first distance and nodes of patterns adjacent to each other at a second distance larger than the first distance are connected with each other by an edge; classifying each of the patterns produced based on the pattern layout diagram into two types so that two patterns corresponding to the nodes at both ends of the edge are types different to each other; and dividing the pattern layout diagram based on a classification result.

A program product according to an embodiment of the present invention causes a computer to execute: producing a graph in which patterns produced based on a pattern layout diagram are each regarded as nodes and nodes of patterns adjacent to each other at a first distance are connected with each other by an edge; classifying each of the patterns produced based on the pattern layout diagram into two types so that two patterns corresponding to the nodes at both ends of the edge are types different to each other; correcting a classification result by grouping the patterns produced based on the pattern layout diagram in each node cluster connected by the edge or each node cluster connected via the node by the edge, and by inverting each of types of the pattern belonging to a same group as that of one pattern, out of a pair of patterns that are classified into a same type and that belong to respectively different groups adjacent to each other at a second distance larger than the first distance; and creating the pattern layout diagram based on the corrected classification result.

A semiconductor device manufacturing method according to an embodiment of the present invention comprises: producing a graph in which patterns produced based on a pattern layout diagram are each regarded as nodes and nodes of patterns adjacent to each other at a first distance are connected with each other by an edge; classifying each of the patterns produced based on the pattern layout diagram into two types so that two patterns corresponding to the nodes at both ends of the edge are types different to each other; correcting a classification result by grouping the patterns produced based on the pattern layout diagram in each node cluster connected by the edge or each node cluster connected via the node by the edge, and by inverting each of types of the pattern belonging to a same group as that of one pattern, out of a pair of patterns that are classified into a same type and that belong to respectively different groups adjacent to each other at a second distance larger than the first distance; creating the pattern layout diagram based on the corrected classification result; and forming the patterns on a semiconductor substrate based on the created pattern layout diagram.

BRIEF DESCRIPTION OF THE DRAWINGS

FIG. 6 is a flowchart of an operation of the pattern-layout creating apparatus according to the first embodiment;

FIGS. 8A and 8B are schematic diagrams for explaining an example of dividing a pattern layout diagram;

DETAILED DESCRIPTION OF THE INVENTION

Exemplary embodiments of a pattern layout creation method, a program product, and a semiconductor device manufacturing method according to the present invention will be explained below in detail with reference to the accompanying drawings. The present invention is not limited to the following embodiments.

First, to support understanding, a process of forming a contact hole in an interlayer insulating film formed to cover a substrate formed thereon with a gate electrode is used as an example to explain a double patterning technique.

Figure 1A:
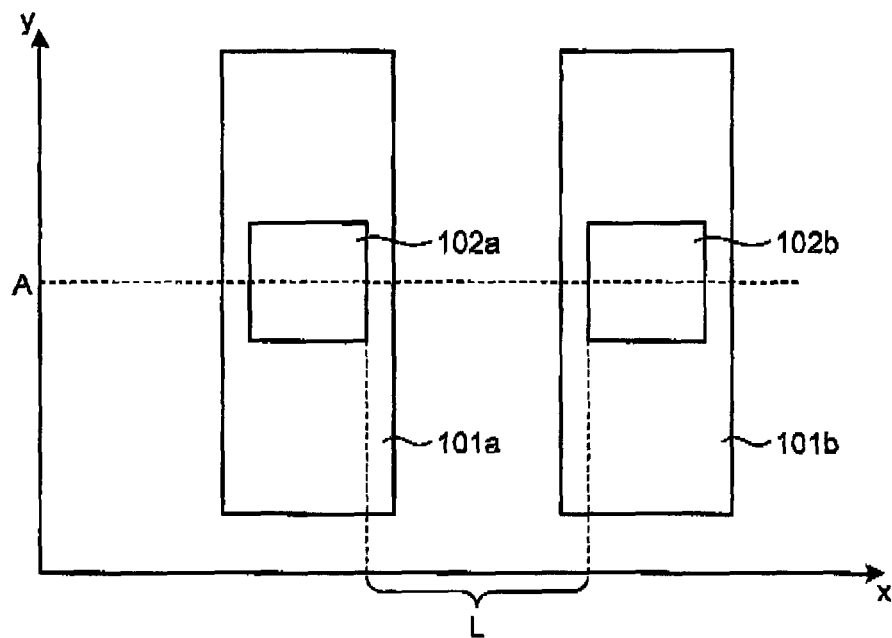
FIGS. 1A and 1B are schematic diagrams for explaining a layout of a contact.
Figure 1B:
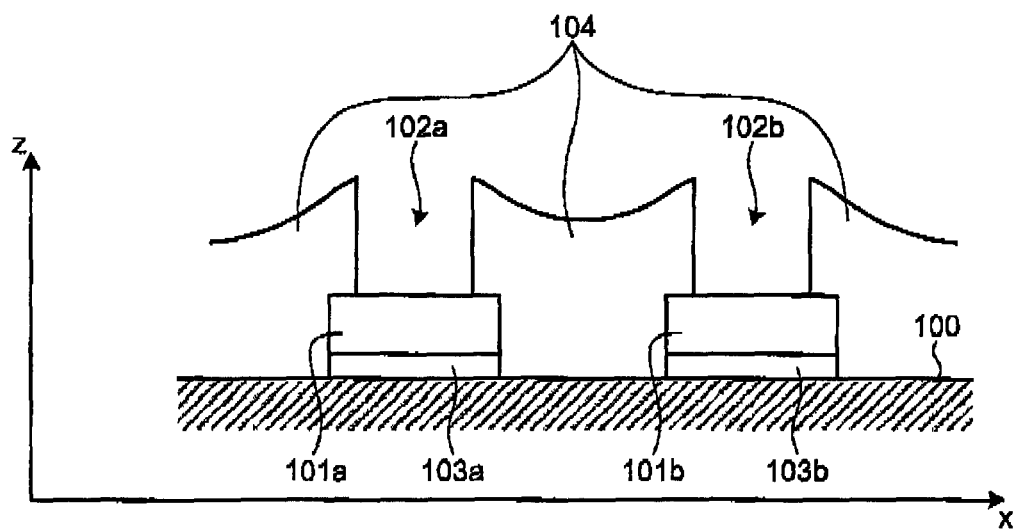

FIG. 1A is a schematic diagram for explaining a layout of a contact hole to be formed, viewed from above a vertical direction (a z-axis direction) relative to a wafer surface. As shown in FIG. 1A, on a substrate 100, there are respectively formed a rectangular gate electrode 101a and gate electrode 101b when a y-axis direction is a lengthwise direction. At positions of y=A on each gate electrode 101a and 101b, contact holes 102a and 102b are respectively laid out. The contact holes 102a and 102b are spaced at a distance L. FIG. 1B is a cross-sectional diagram (at the position of y=A) of the wafer shown in the layout diagram of FIG. 1A. As shown in FIG. 1B, the gate electrodes 101a and 101b are respectively formed on gate oxide films 103a and 103b formed on the substrate 100. An interlayer insulating film 104 is formed to cover the substrate 100 together with each of the gate electrodes 101a and 101b formed on the substrate 100. The contact holes 102a and 102b are formed in the interlayer insulating film 104 and etched from above the gate electrodes 101a and 101b, as shown in FIG. 1B. Contacts are formed by embedding a contact material in the formed contact holes 102a and 102b after the formation of the contact holes 102a and 102b.

At the time of forming the contact holes 102a and 102b in the interlayer insulating film 104, the following two processes are performed: a photolithography process in which a photosensitive paste (resist) is coated or laminated on the interlayer insulating film 104, which is irradiated with light via a photomask formed thereon with a light shielding unit and a light passing unit in a predetermined pattern, thereby curing or degrading a resist region onto which the light that has passed through the light passing part forms an image, and a predetermined part is melt and removed by development, whereby a contact hole pattern is formed on the resist; and an etching process of etching the formed contact hole pattern on the resist, as a mask, to open the contact hole in the interlayer insulating film 104.

In this case, in an exposure device that performs a photolithography process, a minimum distance (hereinafter, "limit distance") capable of obtaining a desired transfer resolution in the lithography process is determined depending on various factors such as a wavelength of light used, a numerical aperture of a lens, the shape of a light source, and a lithography condition. When the distance L is less than the limit distance, it is not possible to form images of the pattern for the contact holes 102a and 102b on the resist with the exposure in which one photomask is used. Accordingly, the double patterning technique of separately exposing the patterns for the contact holes 102a and 102b by using two photomasks is effective.

A process of forming the contact holes 102a and 102b in the interlayer insulating film 104 by using the double patterning technique is described. There are various techniques in the double patterning technique. In this case, as an example, a technique of repeating a lithography process and an etching process for two times is described with reference to FIGS. 2A to 2E.

Figure 2A:
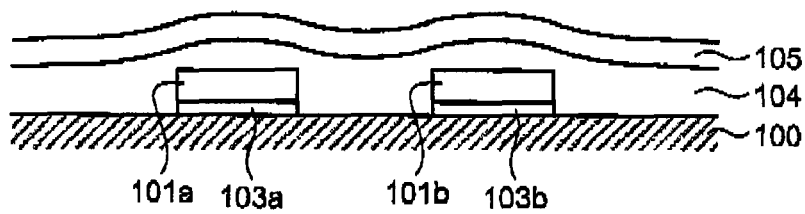
FIGS. 2A to 2E are schematic diagrams for explaining processes of forming a contact in an interlayer insulating film by using a double patterning technique.
Figure 2B:
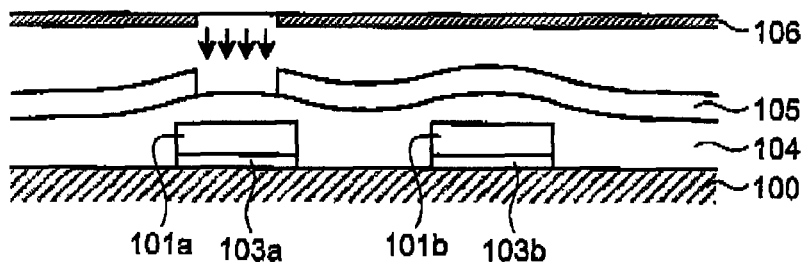
Figure 2C:
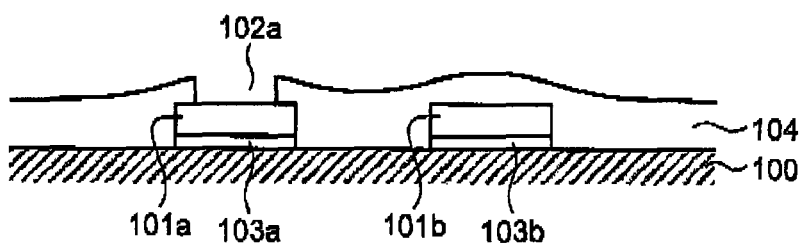

First, as shown in FIG. 2A, a resist film 105 is formed on the interlayer insulating film 104. As shown in FIG. 2B, the resist film 105 is then developed by being exposed via a first photomask 106 formed with a mask pattern for the contact hole 102a, thereby forming a resist pattern for the contact hole 102a. In this case, the resist film 105 is a positive resist from which the exposed part is removed. The formed resist pattern is then used as a mask to etch the interlayer insulating film 104, and thereafter, the remaining resist pattern is removed. As a result, a wafer formed thereon with the contact hole 102a is obtained, as shown in FIG. 2C.

Figure 2D:
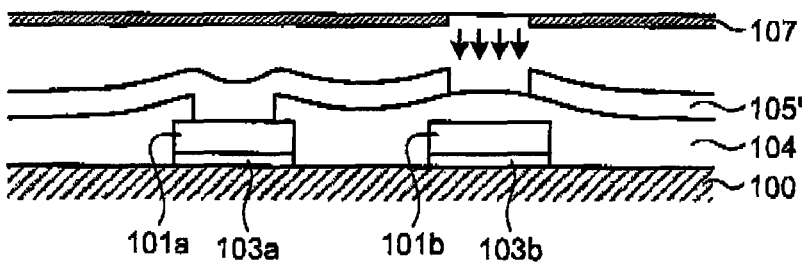
Figure 2E:
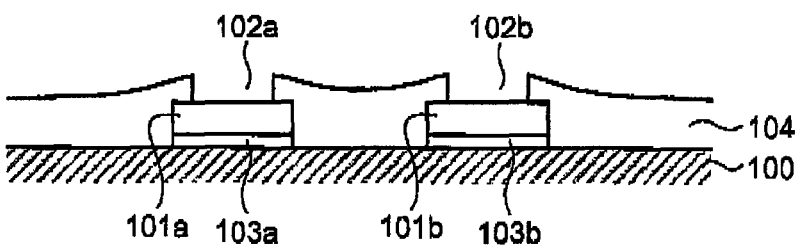

Thereafter, as shown in FIG. 2D, the resist material is coated again to form a resist film 105' on the interlayer insulating film 104 again. The resist film 105' is developed by being exposed via a second photomask 107 formed thereon with a mask pattern for the contact hole 102b, thereby forming a resist pattern for the contact hole 102b in the resist film 105'. The formed resist pattern is then used as a mask to etch the interlayer insulating film 104. Thereafter, the remaining resist pattern is removed, thereby obtaining a wafer formed thereon with the contact holes 102a and 102b as well, as shown in FIG. 2E.

As a method of creating the patterns of the contact holes 102a and 102b by using the double patterning technique, besides the method described above, the following method is also possible. That is, a hard mask (such as a nitride film) is formed on the interlayer insulating film 104, the resist is formed on the hard mask, the first photomask 106 is used for the resist to form a pattern for the contact hole 102a, after the resist is used as a mask to perform etching to transfer the pattern for the contact hole 102a to the hard mask, the resist is formed again on the hard mask, the second photomask 107 is used for the resist to form the pattern for the contact hole 102b, the resist pattern is used as a mask to perform etching to transfer the pattern for the contact hole 102b to the hard mask, and finally, the hard mask is used as a mask to perform etching, thereby forming the contact holes 102a and 102b in the interlayer insulating film 104.

In this way, according to the double patterning technique, the contact holes 102a and 102b are respectively exposed by using the first photomask 106 and the second photomask 107, thereby forming the contact holes 102a and 102b arranged adjacent at a distance less than the limit distance. That is, when the double patterning technique is used, at the time of designing a pattern layout of the contact hole pattern for the photomask, there is performed a task of classifying the respective contact hole patterns into two types, that is, a type of exposing by using one photomask and a type of exposing by using the other photomask so that the contact hole patterns adjacent at an interval less than the limit distance are exposed by two different photomasks.

The film thickness of the resist varies depending on a wafer in-plane or between each coating device, and thus an appropriate exposure amount used for finishing the pattern to a desired dimension varies. Moreover, depending on various factors such as an uncertainty of a focal position of the exposure device and aberration of a lens, the focal position varies. The exposure amount variation leads to an error of a finished dimension of the resist pattern, and the focal position variation, in turn, leads to a shift of the finished shape of the resist pattern. In this way, in the lithography process, the fluctuation of the exposure amount and the focal position greatly affects the finished dimension of the resist pattern or the shape thereof all the time. Accordingly, to produce LSIs having a small line width and a highly dense pattern in a large quantity, it becomes necessary to secure at least a certain level of a margin of the exposure amount (exposure amount margin) and a margin of the focal position (focus margin). The exposure amount margin and the focus margin are collectively called a process margin below. For the process margin, margins of an exposure amount and a focal position such that the shift of a shape can be brought within a permissive range, for example within 10%, can be adopted.

Locally, the process margin in the pattern layout has a close relation with the density of patterns (pattern density). For example, a focus margin is smaller in a part in which the pattern density is low in the mask layout than a part in which the pattern density is high, and according thereto, the exposure amount margin tends to be smaller. For this case, when there is the part in which the pattern density is low, there are various methods of improving the process margin of this part. One of the methods is a technique of arranging a minute assist pattern (Sub Resolution Assist Feature (SRAF)) not actually transferred in the part in which the pattern density is low. The pattern density is virtually improved in the part in which the SRAF is arranged, and thereby, the process margin of this part is improved.

Figure 3:
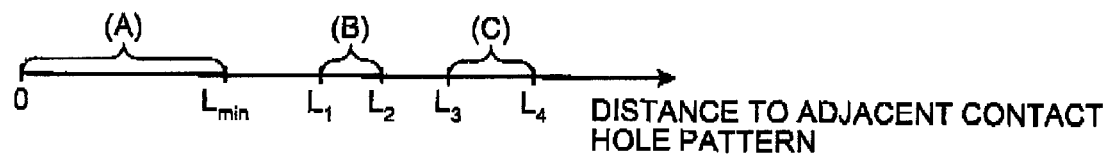
FIG. 3 is a schematic diagram for explaining a distance between adjacent contact hole patterns.

The SRAFs are often arranged at a position spaced from a pattern by a constant distance (for example, the limit distance) determined depending on various factors such as a wavelength of light used, a numerical aperture of a lens, the shape of a light source, and lithography conditions in a manner to surround around the pattern. However, due to a distance to the adjacent pattern, it is sometimes difficult to arrange the SRAFs. With reference to FIG. 3 and FIG. 4, a restriction about the arrangement of the contact hole pattern and the SRAF when the SRAF is added to the mask layout diagram of the contact hole pattern is described.

In FIG. 3, when the distance between the contact hole patterns is less than a limit distance (Lmin) (in a case of an area (A)), as described above, the both contact hole patterns are not resolved with a desired transfer resolution. Accordingly, when the double patterning technique is applied, the contact hole pattern is targeted to be split separately into two different photomasks.

Figure 4A:
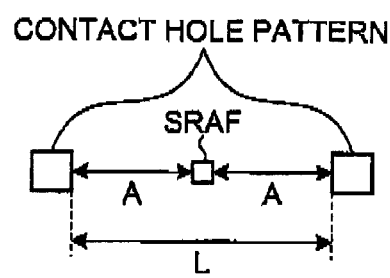
FIG. 4 is a schematic diagram for explaining a method of arranging SRAFs.
Figure 4B:
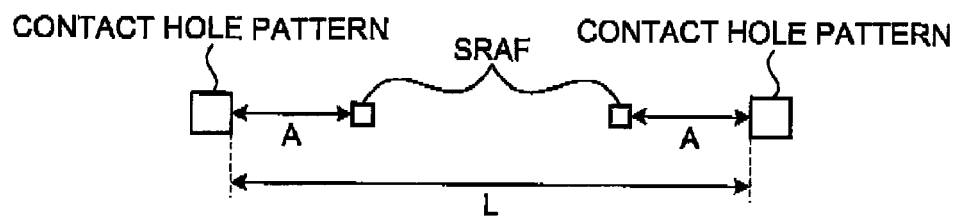

When the distance between the contact hole patterns exceeds Lmin, the contact hole pattern can be resolved. When a certain distance L1 (Lmin<L1) is exceeded. However, because of a decrease in pattern density (in this case, the density of the contact hole pattern), the process margin in this part decreases, and thus it becomes necessary to arrange the SRAF. Examples of a method of arranging the SRAF in the two contact hole patterns spaced by at least L1 can include: a first arrangement method, as shown in FIG. 4A, of arranging one SRAF between the contact hole patterns to improve the process margin of the two contact hole patterns by one SRAF, and a second arrangement method of arranging one SRAF each in the respective contact hole patterns, as shown in FIG. 4B, when the distance between the two contact hole patterns is greater.

However, as described above, the optimal distance (distance A in FIG. 4) from the contact hole pattern in which the SRAF is arranged is determined. Thus, when the distance between the SRAF and the contact hole pattern is either too short or too long from the optimal distance, the intended effect cannot be achieved. Moreover, a minimum distance required between the SRAFs is also determined. Accordingly, depending on a distance between the contact hale patterns, the first and second installation methods cannot be adopted. In FIG. 3, when the distance between the contact patterns is less than L2, the distance between the contact hole patterns is too short, and thus the required distance between the SRAF and each contact hole pattern cannot be prepared. As a result, the first installation method cannot be adopted. In a range between L1 and L2 (area (B) in FIG. 3A), it is necessary to arrange the SRAF. However, because the first installation method cannot be adopted, this range is an area where no SRAF can be arranged. In an area between L2 and L3, the first installation method can be adopted, and thus, in this area, it is possible to improve the process margin of the two contact hole patterns. In a range between L3 and L4 (area (C) in FIG. 3A), the distance between the two contact hole patterns is too long to adopt the first installation method and too short to adopt the second installation method. Thus, this range is an area where the installation of the SRAF is impossible. When L4 is exceeded, it becomes possible to adopt the second installation method.

Even when the distance between the contact hole patterns is included in the ranges of the area (B) and the area (C), the application of the double patterning technique is effective. That is, when the two contact hole patterns are split into different photomasks and the SRAFs are separately added to the respective split contact hole patterns, it becomes possible for the respective contact hole patterns to secure a sufficient process margin. As a result, it becomes possible to exposure with a high resolution. A distance in which the SRAF used for obtaining a desired process margin cannot be arranged when the two contact hole patterns are arranged on the same photomask, like the distance included in the ranges of the area (B) and the area (C), is expressed as an intermediate pitch below.

A main characteristic of a pattern-layout creating apparatus according to a first embodiment of the present invention is as follows. When a layout diagram of one mask pattern or design pattern (hereinafter, a mask-pattern design diagram and a design pattern design diagram are collectively called "pattern layout diagram") used for producing a photomask is split into two pattern layout diagrams used for producing two photomasks, the pattern layout diagram is split so that not only the patterns adjacent at the limit distance, but also the patterns adjacent at the intermediate pitch are exposed, if possible, by different photomasks.

Figure 5:
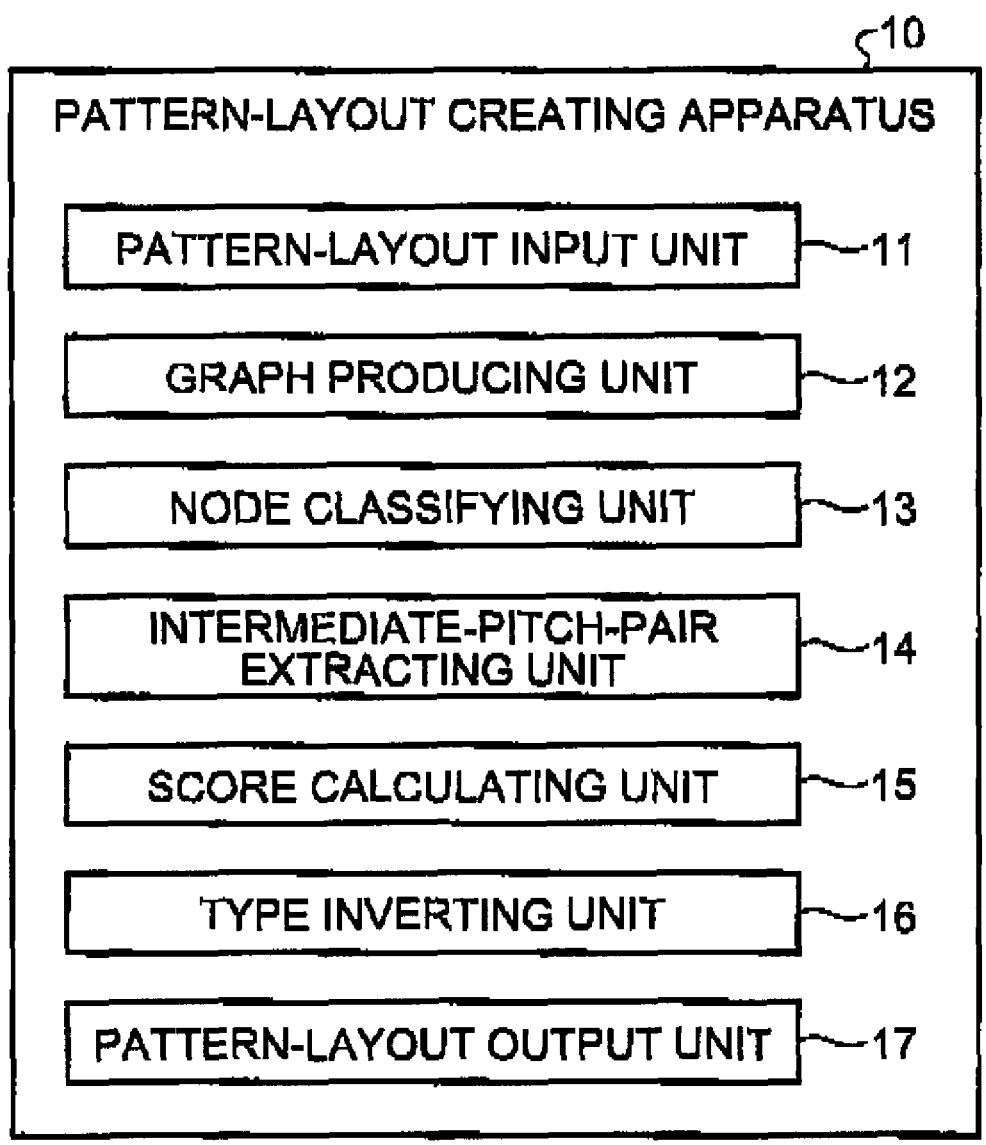
FIG. 5 is a block diagram of a configuration of a pattern-layout creating apparatus according to a first embodiment of the present invention.

FIG. 5 is a block diagram for explaining a configuration of the pattern-layout creating apparatus according to the first embodiment. As shown in FIG. 5, as a configuration used for realizing the characteristic described above, the pattern-layout creating apparatus 10 includes: a pattern-layout input unit 11 that accepts a pattern layout diagram input from an external memory device or the like; a graph producing unit 12 that produces a graph in which the contact hole pattern from the pattern layout diagram that the pattern-layout input unit 11 accepts is regarded as a node and nodes adjacent at less than the limit distance are connected with an edge; a node classifying unit 13 that classifies the nodes into two types based on the graph produced by the graph producing unit 12; an intermediate-pitch-pair extracting unit 14 that extracts a pair of contact hole patterns adjacent at the intermediate pitch from the pattern layout diagram that the pattern-layout input unit 11 accepts; a type inverting unit 16 that modifies (inverts) types of the nodes classified into two types by the node classifying unit 13 intended to reduce the number of intermediate pitch pairs present in the pattern layout diagram that has been split; a score calculating unit 15 that calculates a score used for specifying a node targeted for a type modification; and a pattern-layout output unit 17 that splits the pattern layout diagram that the pattern-layout input unit 11 accepts into two pattern layout diagrams used for producing the photomasks each separately exposed based on the types of the nodes, and outputs the two pattern layout diagrams that have been split to an external memory device or the like.

Operations of the pattern-layout creating apparatus 10 are described next with reference to FIG. 6, FIGS. 7A to 7E, FIGS. 8A and 8B, FIG. 9, and FIG. 10. FIG. 6 is a flowchart for explaining the operation of the pattern-layout creating apparatus 10 and a pattern-layout creation method using the pattern-layout creating apparatus 10.

First, in FIG. 6, the pattern-layout input unit 11 accepts the pattern layout diagram (Step S1). The graph producing unit 12 regards the contact hole pattern, as the node, from the pattern layout diagram that the pattern-layout input unit 11 accepts and produces a graph in which the nodes of the contact hole patterns respectively adjacent at a distance less than the limit distance are connected with an edge (Step S2).

Figure 7A:
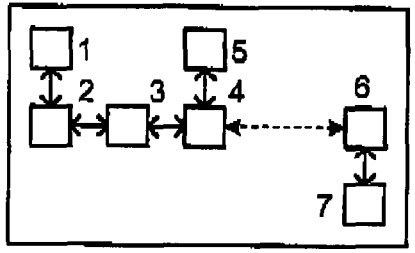
FIGS. 7A to 7E are schematic diagrams for explaining the operation of the pattern-layout creating apparatus according to the first embodiment.
Figure 7B:
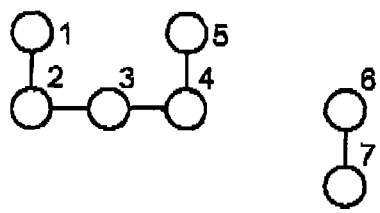

FIG. 7A is an example of the pattern layout diagram before division. To facilitate explanations thereof, an identification number for each contact hole pattern is designated near each contact hole pattern. Contact hole patterns 1 and 2, 2 and 3, 3 and 4, 4 and 5, and the contact hole patterns 6 and 7 are mutually adjacent at the distance less than the limit distance.

Contact hole patterns 4 and 6 are adjacent at the intermediate pitch. The graph producing unit 12 produces a graph shown in FIG. 7B from this pattern layout diagram. The respective numerals designated near the nodes respectively correspond to the identification number for each contact hole pattern before producing the graph.

Subsequent to Step S2, the node classifying unit 13 classifies all the nodes into two types, that is, a first type and a second type so that the nodes at the both ends of the edge belong to respectively different types, based on the graph produced by the graph producing unit 12 (Step S3). In this case, it is rather easier to understand that the two types are expressed in two colors (the first type is black and the second type is white), and the node classifying unit 13 colors all the nodes in two colors, that is, black and white.

Coloring of the nodes by the node classifying unit 13 can be performed by any suitable method. For example, the node classifying unit 13 determines the color for one node and determines the color of a node connected to that node by the edge as a color opposite to that of the node of which the color is determined. When the edge and each node are traced back, the colors of the passed nodes are decided one after another. The nodes not connected to the edge can be colored in either color. When an odd number of nodes configures a path called a simple cycle in which a start-point node and an end-point node agree and tracing back is possible without passing through the same edge twice or more and without passing though the same node twice or more, in the nodes configuring the simple cycle, in principle, a portion (conflict) in which the nodes at the both ends of the edge cannot be colored in different colors is produced. When the conflict occurs, proceeding to a next step can be made regardless to the conflict that has occurred, and alternatively, the node classifying unit 13 can determine all the nodes configuring the simple cycle as either one of the colors.

Figure 7C:
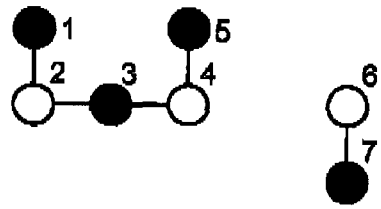

FIG. 7C is an example in which the nodes in the graph shown in FIG. 72 are colored in two colors by the node classifying unit 13. As shown in FIG. 7C, nodes 1, 3, 5, and 7 are colored black and nodes 2, 4, and 6 are colored white.

Finally, the pattern-layout creating apparatus 10 splits one pattern layout diagram that the pattern-layout input unit 11 accepts, and outputs two pattern layout diagrams. The two types, that is the two colors, indicate in which of the finally output two pattern layout diagrams (a first pattern layout diagram and a second pattern layout diagram) each node (contact hole pattern) is written, that is, exposed by the photomask created from either one of the pattern layout diagrams. As a result of the coloring by the node classifying unit 13 at Step S3, the contact hole patterns adjacent at the distance less than the limit distance are exposed by different photomasks in principle.

When the two pattern layout diagrams are created based on the classification result at Step S3, as described above, there is a case that the pair of contact hole patterns adjacent at the intermediate pitch is left in the divided pattern layout diagram. FIG. 8A is a pattern layout diagram that has been split when the pattern layout diagram shown in FIG. 7A is split into two pattern layout diagrams based on the graph shown in FIG. 7C. The contact hole patterns corresponding to the nodes colored black (first type) are written in the first pattern layout diagram, and the contact hole patterns corresponding to the nodes colored white (second type) are written in the second pattern layout diagram. As shown in FIG. 8A, a pair of the contact hole patterns 4 and 6 adjacent at the intermediate pitch are written in the second pattern layout diagram. That is, between the contact hole patterns 4 and 6, the SRAF cannot be arranged, and thus insufficiency of the process margin cannot be dissolved. At following steps, as a result of co-working of the intermediate-pitch-pair extracting unit 14, the score calculating unit 15, and the type inverting unit 16, each pattern is grouped for each node cluster directly or indirectly connected by the edge. A state of being indirectly connected by the edge is namely a state of being connected from a target pattern (node) via one or more nodes (patterns) by the edge. Moreover, by inverting types of one pattern (out of a pair of patterns, which are respectively adjacent at the intermediate pitch, which are classified into the same type (same color) belonging to groups different to each other) and a pattern belonging to the same group as this pattern, the classification result at Step S3 is corrected, thereby reducing the number of pairs of same-type contact hole patterns (left after being split) that are adjacent at the intermediate pitch. In this case, the example thereof is a pair of the contact hole patterns 4 and 6.

Subsequent to Step S3, the intermediate-pitch-pair extracting unit 14 extracts all the pairs of the contact hole patterns adjacent at the intermediate pitch from the pattern layout diagram that the pattern-layout input unit 11 accepts (Step S4), and separates the pairs of the extracted contact hole patterns (intermediate pitch pair) into a pair of same-color nodes (same-type intermediate pitch pair) and a pair of different-color nodes (different-type intermediate pitch pair) (Step S5). The same-type intermediate pitch pair, which is left as the contact hole patterns adjacent at the intermediate pitch in either one of the split pattern layout diagrams when the pair is split as it is, is a removal target by the pattern-layout creating apparatus 10.

By the intermediate-pitch-pair extracting unit 14, a pair of the contact hole pattern 4 and the contact hole pattern 6 are extracted as the intermediate pitch pair from the pattern layout diagram shown in FIG. 7A, and further, the node 4 and the node 6 are of the same color (white), and thus the pair of the node 4 and the node 6 are recognized as the same-type intermediate pitch pair.

Subsequent to Step S5, the intermediate-pitch-pair extracting unit 14 regards the node cluster connected directly and indirectly by the edge as one group, and extracts the same-type and different-type intermediate pitch pairs of the nodes belonging to the different groups from the separated same-type and different-type intermediate pitch pairs (Step S6). The same-type intermediate pitch pair of the nodes belonging to the different groups is expressed as an inter-group same-type intermediate pitch pair, and the different-type intermediate pitch pair of the nodes belonging to the different groups is expressed as an inter-group different-type intermediate pitch pair below.

Figure 7D:
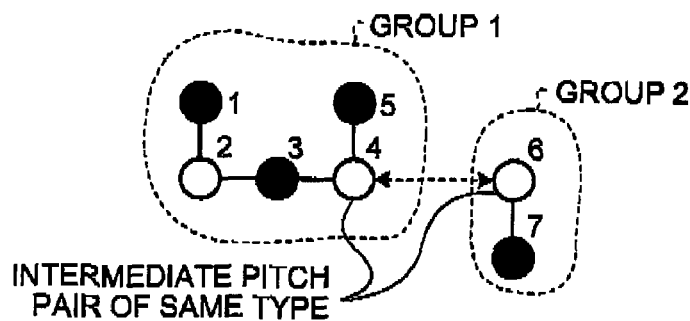

When the concept of the group is introduced to the graph in FIG. 7C, the graph in FIG. 7C is to have a group 1 and a group 2 as shown in FIG. 7D. As a result, by the intermediate-pitch-pair extracting unit 14, a pair of the node 4 and the node 6 are extracted as the inter-group same-type intermediate pitch pair.

Subsequent to Step S5, the score calculating unit 15 regards the node cluster mutually connected directly or indirectly by the edge as one group, and calculates a score for each group based on the number of the inter-group same-type intermediate pitch pairs and that of the inter-group different-type intermediate pitch pairs (Step S7). Specifically, the score calculating unit 15 uses 0 (zero) as a reference score, and adds the number of the inter-group same-type intermediate pitch pairs provided in a group targeted for score calculation, to the reference score, and in addition, subtracts the number of inter-group different-type intermediate pitch pairs provided in the group targeted for score calculation, and regards the obtained value as a score of the group targeted for score calculation.

Figure 9:
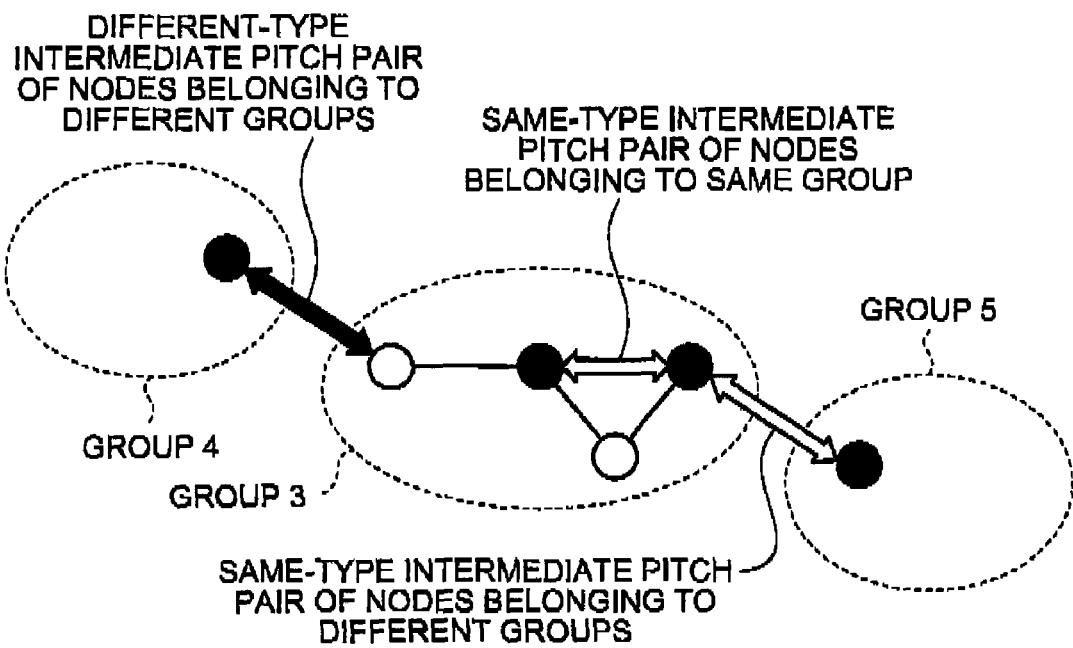
FIG. 9 is a schematic diagram for explaining a score calculating method.

FIG. 9 is a schematic diagram for explaining a method of calculating a score by the score calculating unit 15. In FIG. 9, a group 3, a group 4, and a group 5 are shown. The inter-group different-type intermediate pitch pair is expressed as closed bi-directional arrows, and the inter-group same-type intermediate pitch pair is expressed as open bi-directional arrows. In FIG. 9, between the group 3 and the group 4, there is one inter-group different-type intermediate pitch pair, and between the group 3 and the group 5, there is one inter-group same-type intermediate pitch pair, and thus the score of the group 3 is "±0". The group 3 has the same-type intermediate pitch pair (inter-group same-type intermediate pitch pair) of the nodes belonging to the same group. However, the number of inter-group same-type intermediate pitch pairs is not reflected on the score.

Subsequent to Step S7, the type inverting unit 16 counts the number (N) of the inter-group same-type intermediate pitch pairs to determine whether N is equal to or more than 1 (Step S8). When N is not equal to or more than 1 (NO at Step S8), the pattern-layout output unit 17 produces two pattern layout diagrams based on the color of the node, and outputs the produced two pattern layout diagrams to an external memory device or the like (Step S15). That is, the pattern-layout output unit 17 writes the contact hole pattern corresponding to the first type node in the first pattern layout diagram and the contact hole pattern corresponding to the second type node in the second pattern layout diagram, for example.

When at Step S8, N, that is the number of the inter-group same-type intermediate pitch pairs, is a value equal to or more than 1 (YES at Step S8), the type inverting unit 16 selects one group including the nodes configuring the inter-group same-type intermediate pitch pair and having the highest score (Step S9), and inverts the color of each node included in the selected group from white to black or from black to white (Step S10).

Figure 7E:
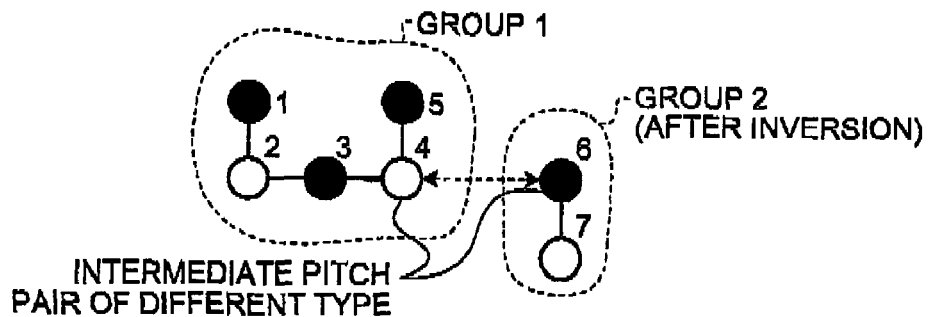

In FIG. 7D, when the color of the nodes in the group 2 is inverted, the node 6 is inverted from white to black and the node 7 is inverted from black to white. As a result, as shown in FIG. 7E, a pair of the node 4 and the node 6 are changed from the inter-group same-type intermediate pitch pair to the inter-group different-type intermediate pitch pair. When the group 2 includes the nodes configuring the inter-group different-type intermediate pitch pair, as a result of the inversion of the color of the nodes in the group 2, this inter-group different-type intermediate pitch pair is to be changed to the inter-group same-type intermediate pitch pair. In the two pattern layout diagrams produced by splitting based on the graph in FIG. 7E, there is no contact hole pattern pair adjacent at the intermediate pitch, as shown in FIG. 8B.

Subsequent to Step S10, the type inverting unit 16 determines whether the number of N is reduced before and after the inverting process at Step S10 (Step S11), and when the number of N is reduced (YES at Step S11), the color of the nodes included in the group inverted at Step S10 is determined (Step S12). At this time, when the inverting process is performed, the score calculating unit 15 re-calculates the score again. When the number of N is not reduced (NO at Step S11), the type inverting unit 16 determines the color of the nodes included in the group selected at Step S9 by the color before the inverting process is performed at Step S10 (Step S13).

After Step S12 or Step S13, the type inverting unit 16 determines whether any one of conditions (conditions A in FIG. 6), that is, a condition under which N=0 is true or a condition under which the color of nodes of all the groups having the inter-group same-type intermediate pitch pair is determined, is satisfied (Step S14). When any one of the conditions is satisfied (YES at Step S14), the process moves to Step S15, and when not satisfied (NO at Step S14), the process moves to Step S9.

Figure 10:
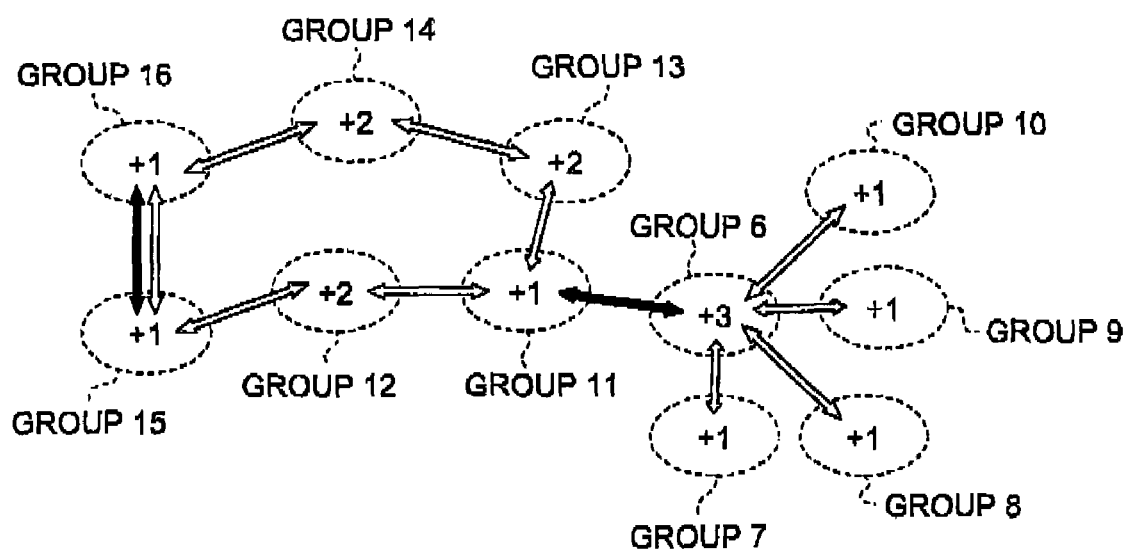
FIGS. 10 to 15 are schematic diagrams for explaining operations of reducing a same-type pitch pair in a large scale graph.

A state where the number of the inter-group same-type intermediate pitch pairs is reduced by the operation described above is specifically explained with reference to FIG. 10 to FIG. 14. FIG. 10 is an example of a graph larger than the graph shown in FIG. 7D. In FIG. 10, to avoid complication, detailed illustrations of the node and the edge are omitted, and the groups (parts each surrounded by dotted lines), the inter-group different-type intermediate pitch pair (closed bi-directional arrows), and the inter-group same-type intermediate pitch pair (open bi-directional arrows) only are shown. Numbers with a symbol of plus of minus designated to each of a group 6 to a group 16 respectively indicate a score of each group. At this time, the number (N) of the inter-group same-type intermediate pitch pairs is 10.

Figure 11:
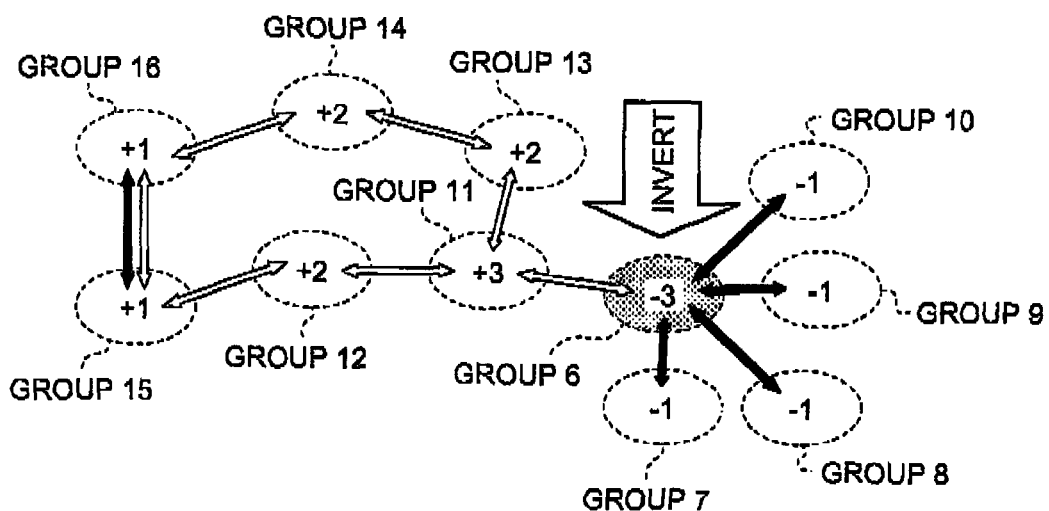

FIG. 11 depicts a state that by the operation at Step S9, the group 6 is selected from the group cluster shown in FIG. 10 as a group having the inter-group same-type intermediate pitch pair and having the highest score, and by the operation at Step S10, the node belonging to the group 6 is inverted. As a result of this inversion, each inter-group same-type intermediate pitch pair existing between the group 6, and the groups 7, 8, 9, and 10 is changed to the inter-group different-type intermediate pitch pair, and at the same time, each inter-group different-type intermediate pitch pair existing between the group 6 and the group 11 is changed to the inter-group same-type intermediate pitch pair. At this time, the scores of the groups 6, 7, 8, 9, 10, and 11 are changed to −3, −1, −1, −1, −1, and +3, respectively. As a result of this change, the number of N is reduced from 10 to 7, and thus, the process moves to Step S12 at which the color of the nodes belonging to the group 6 is determined at an inverted state shown in FIG. 11. In FIG. 11 to FIG. 15, the determined group is expressed as "meshed" so that the determined group is distinguished from an undetermined group.

Figure 12:
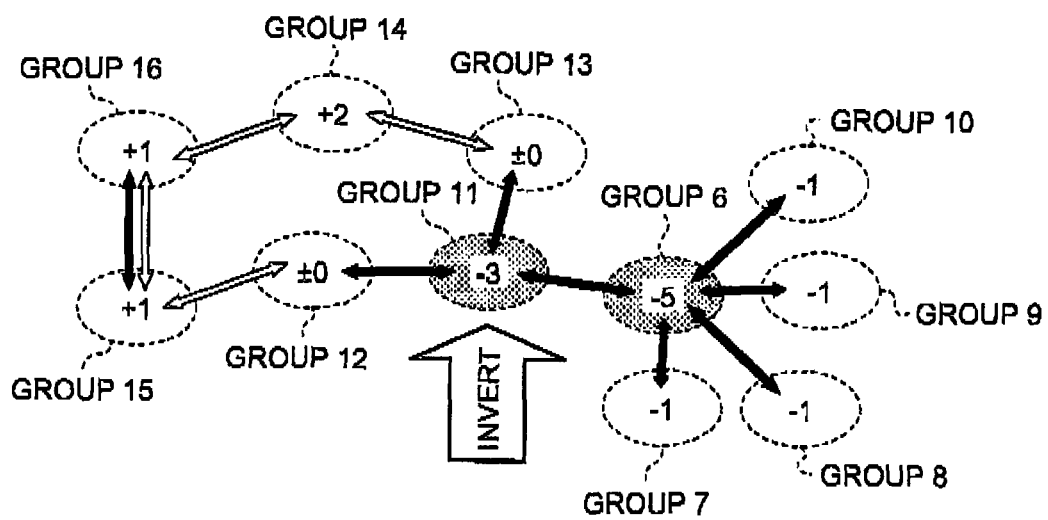

In the state of FIG. 11, the N is not yet 0, and besides, there are still groups, such as the group 11 and the group 12, which have the inter-group same-type intermediate pitch pairs and in which the color of the node are not yet determined. Thus, the process moves to Step S9 again to select the group 11 this time. FIG. 12 is a schematic diagram for explaining a state that the node of the group 11 thus selected is inverted and the color of the node is determined. As a result of this inversion, each inter-group same-type intermediate pitch pair existing between the group 11, and the groups 6, 12, and 13 is changed to the inter-group different-type intermediate pitch pair. The scores of the groups 11, 6, 12, and 13 are changed to −3, −5, ±0, and ±0, respectively. As a result of this change, the number of N is reduced from 7 to 4, and thus the color of the node in the group 11 is determined at an inverted state shown in FIG. 12.

Figure 13:
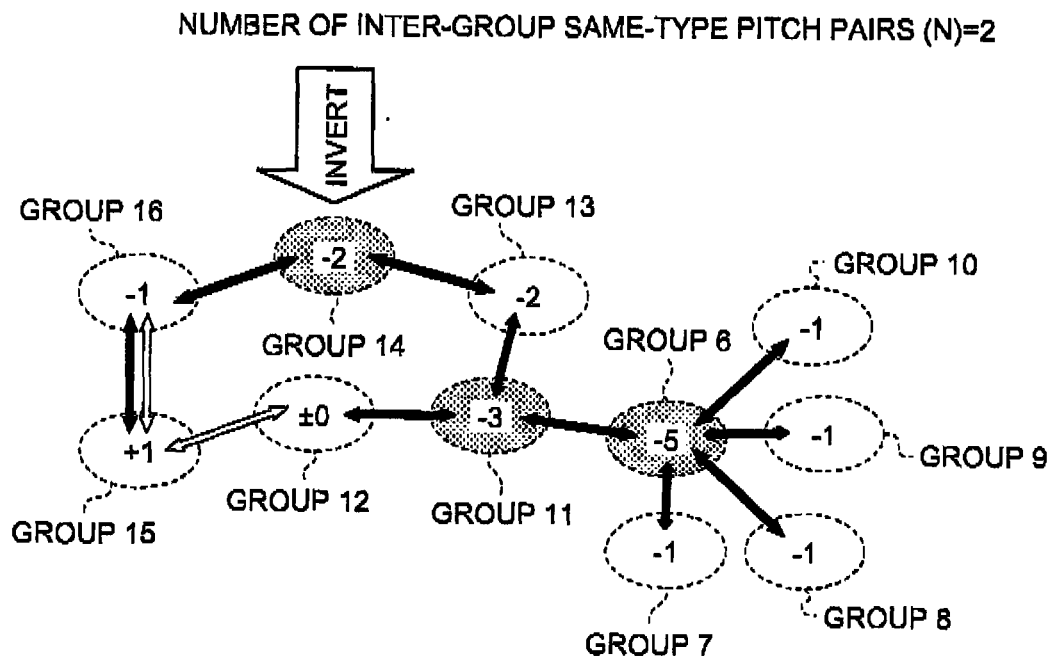

The state shown in FIG. 13 is a state that, by an operation similarly to the above, the group 14 is selected and inverted, the number of N is changed from 4 to 2, and the color of the node in the group 14 is determined. A state shown in FIG. 14 depicts a state that by a similar operation, the group 15 is further selected and inverted, the number of N is changed from 2 to 1, and the color of the node in the group 15 is determined.

Figure 14:
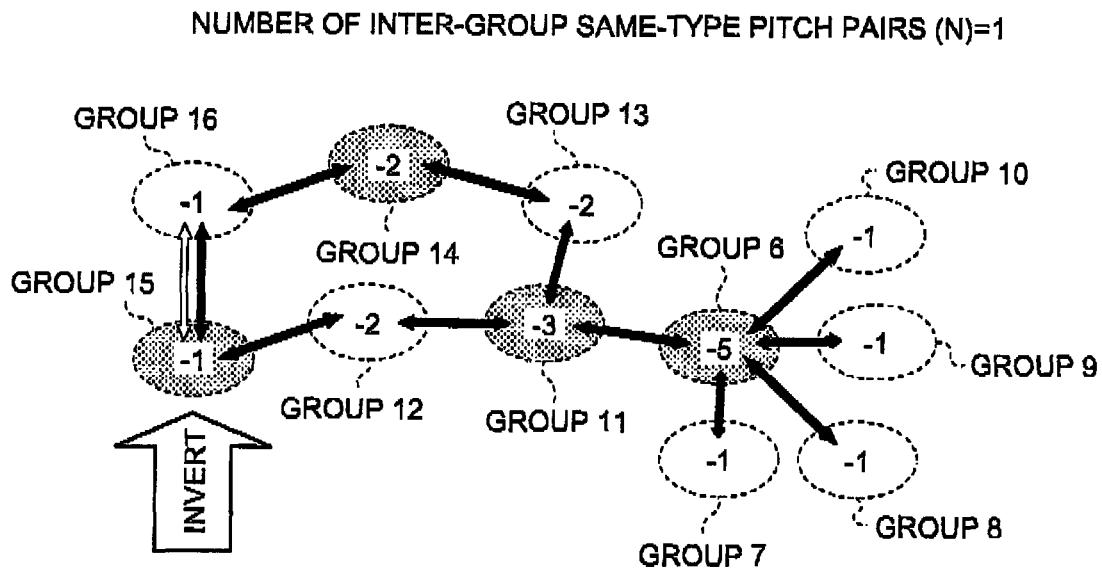

In the state of FIG. 14, the group 16 that includes the inter-group same-type intermediate pitch pair and has the highest score is left, and thus, by the operations at Step S9 and Step S10 again, the group 16 is selected and inverted. The total of two pairs of inter-group different-type intermediate pitch pairs each existing between the group 16 and the groups 14 and 15 are changed to the inter-group same-type intermediate pitch pairs, and one pair of inter-group same-type intermediate pitch pairs existing between the group 16 and the group 15 are changed to the inter-group different-type intermediate pitch pair. Before and after this inversion, the number N is increased from 1 to 2. Accordingly, in the state of FIG. 14 that the inversion is performed, the color of the nodes in the group 16 is determined (FIG. 15).

Figure 15:
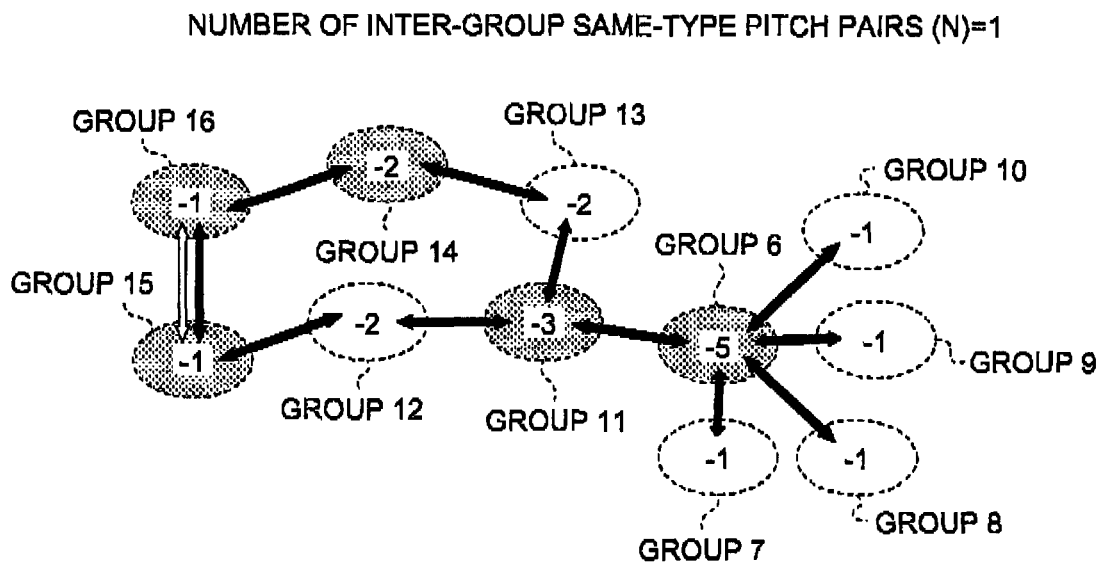

When the process is moved to the state in FIG. 15, in the groups having the inter-group same-type intermediate pitch pair, there is no group in which the color of the node is not determined. Thus, YES is selected at Step S14, and based on the color of the node in the state in FIG. 15, the two pattern layout diagrams are created.

When the state in FIG. 10 is compared with the state in FIG. 15, the number of inter-group same-type intermediate pitch pairs (there are ten pairs in the state of FIG. 10) is finally reduced to one pair. Moreover, the color of the node is inverted for each group, and thus the number of same-type intermediate pitch pairs of the nodes belonging to the same group is not changed by the inversion operation. That is, by the operation described above, the number of same-type inter-mediate pitch pairs is successfully reduced by nine pairs.

Figure 16:
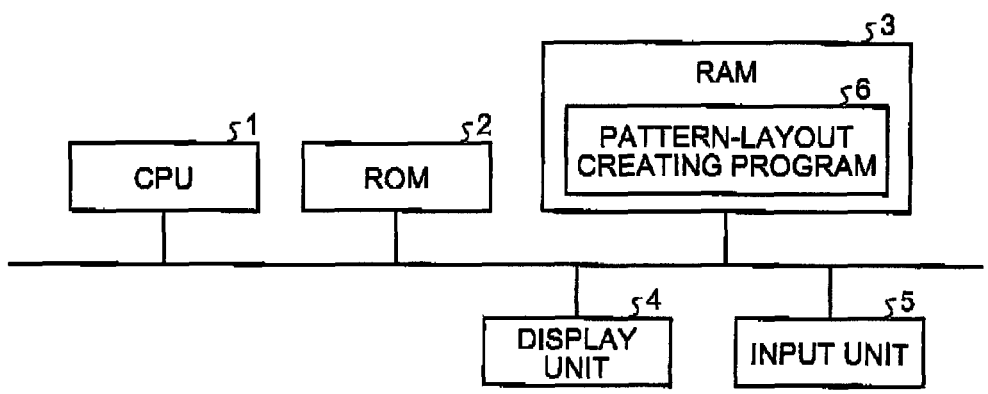
FIG. 16 is a schematic diagram for explaining a hardware configuration of the pattern-layout creating apparatus according to the first embodiment.

The pattern-layout creating apparatus 10 according to the first embodiment can be realized by a computer having a normal hardware configuration. FIG. 16 depicts a hardware configuration of the pattern-layout creating apparatus 10.

The pattern-layout creating apparatus 10 includes a central processing unit (CPU) 1, a read only memory (ROM) 2, a random access memory (RAM) 3, a display unit 4, and an input unit 5. In the pattern-layout creating apparatus 10, the CPU 1, the ROM 2, the RAM 3, the display unit 4, and the input unit 5 are connected via a bus line.

The display unit 4 is a display device such as a liquid crystal monitor. The input unit 5 is an input device configured to include a mouse or a keyboard. A pattern-layout creating program 6 as a program product is stored in the ROM 2, and loaded to the RAM 3 via a bus line. The CPU 1 executes the pattern-layout creating program 6 loaded in the RAM 3. Specifically, in the pattern-layout creating apparatus 10, according to an instruction input by a user from the input unit 5, the CPU 1 reads the pattern-layout creating program 6 from the ROM 2, develops the program in a program storage area in the RAM 3, and performs the operation described above. The CPU 1 temporarily stores various data created at the time of various types of these operations, in the data storage area formed in the RAM 3.

The pattern-layout creating program 6 executed in the pattern-layout creating apparatus 10 according to the first embodiment is configured in a module including each of the constituent elements such as the pattern-layout input unit 11, the graph producing unit 12, the node classifying unit 13, the intermediate-pitch-pair extracting unit 14, the score calculating unit 15, the type inverting unit 16, and the pattern-layout output unit 17. Each of the constituent elements is loaded on the RAM 3 to produce the pattern-layout input unit 11, the graph producing unit 12, the node classifying unit 13, the intermediate-pitch-pair extracting unit 14, the score calculating unit 15, the type inverting unit 16, and the pattern-layout output unit 17, on the RAM 3.

It is possible to have a configuration such that the pattern-layout creating program 6 executed by the pattern-layout creating apparatus 10 according to the first embodiment is stored in a computer connected to a network such as the Internet, and the pattern-layout creating program 6 is provided by downloading it via the network. It is also possible that the pattern-layout creating program 6 executed by the pattern-layout creating apparatus 10 is provided or distributed via a network such as the Internet. Moreover, it is also possible that the pattern-layout creating program 6 is incorporated on a ROM or the like in advance and provided to the pattern-layout creating apparatus 10.

In the above explanations, the process margin is defined as the exposure margin and the focus margin. The process margin can be also defined by at least one margin out of various conditions relating to a process from the exposure to the pattern transfer, that is, an exposure amount, a focal position, a light-source shape and a light-source intensity, a diffusion length of acid in a resist, development, etching, and mask dimension.

As a method of improving the process margin, a technique of arranging the SRAF between the contact patterns adjacent at the intermediate pitch is used. However, the method to improve the process margin is not limited to the technique of arranging the SRAF. Instead of the SRAF, a pattern transferred and formed on a wafer, a device pattern or a dummy pattern, for example, can be arranged. The dummy pattern formed on the wafer is electrically independent of the device pattern on the wafer.

Regarding the pattern-layout design diagram of forming the contact hole pattern on the interlayer insulating film, the example in which the pattern layout diagram is divided is used for explanations. The target pattern layout diagram that the pattern-layout creating apparatus 10 according to the first embodiment divides is not limited to the layout diagram of the contact hole pattern. As long as the patterns are laid out at intervals less than the limit distance, the pattern-layout creating apparatus 10 can divide any pattern layout diagram.

The pattern-layout output unit 17 outputs the two pattern layout diagrams. However, based on the graph obtained at a time point at which YES at Step S14 is satisfied, the pattern-layout output unit 17 can output a result indicating which of the two photomasks is used to expose each of the pattern layout diagrams that the pattern-layout input unit 11 receives. That is, the classification result at a time point at which YES at Step S14 is satisfied can be output.

As described above, according to the first embodiment, the patterns produced based on the pattern layout diagram are each regarded as nodes, the graph in which the patterns adjacent to each other at less than the limit distance are connected by the edge is produced, the nodes are colored (classified) in two colors (two types) so that the nodes at the both ends of the edge are differed in type to each other, the classification result is corrected by inverting the color of the node belonging to the group having the inter-group same-type intermediate pitch pair, and based on the corrected classification result, the pattern layout diagram is divided. Thus, it is possible to divide the pattern layout diagram into two parts so that a highly accurate pattern can be formed. The group in which the type of nodes is inverted is selected based on the number of inter-group same-type intermediate pitch pairs and that of inter-group different-type intermediate pitch pairs, and thus an efficient division can be made.

Figure 17:
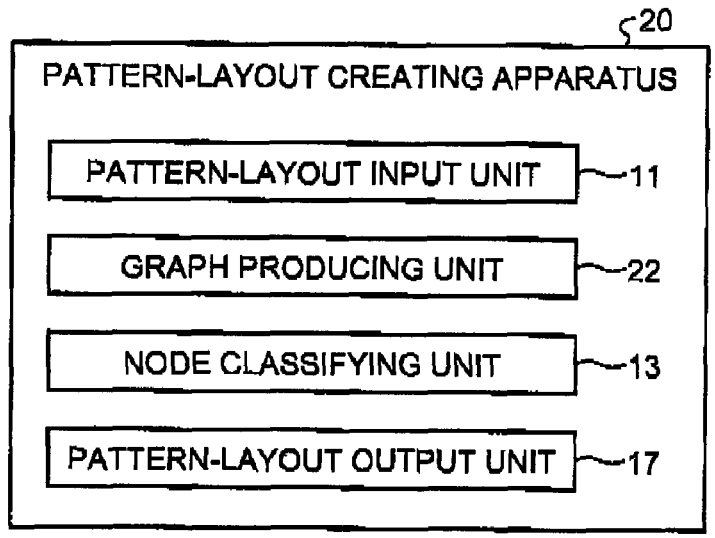
FIG. 17 is a block diagram of a configuration of a pattern-layout creating apparatus according to a second embodiment of the present invention.

FIG. 17 is a block diagram for explaining a configuration of a pattern-layout creating apparatus according to a second embodiment of the present invention. As shown in FIG. 17, the pattern-layout creating apparatus 20 includes the pattern-layout input unit 11, a graph producing unit 22, the node classifying unit 13, and the pattern-layout output unit 17. The pattern-layout input unit 11, the node classifying unit 13, the pattern-layout output unit 17 perform operations identical to those of the first embodiment, and therefore explanations thereof will be omitted.

The graph producing unit 22 regards, as nodes, the contact hole pattern from the pattern layout diagram that the pattern-layout input unit 11 has received, and produces a graph in which not only the nodes adjacent at less than the limit distance, but also the nodes adjacent at the intermediate pitch are connected by the edge. FIGS. 19A to 19D are schematic diagrams for explaining a graph produced by the graph producing unit 22.

Figure 19A:
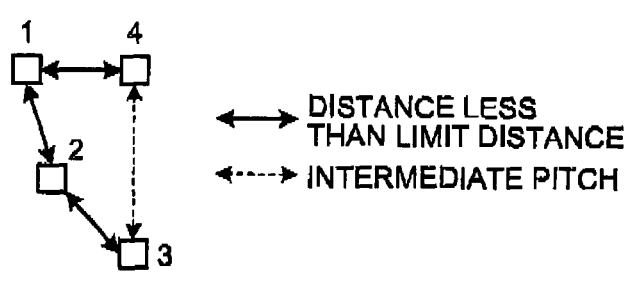
FIGS. 19A to 19D are schematic diagrams for explaining an example of producing a graph of the pattern-layout creating apparatus according to the second embodiment.
Figure 19B:
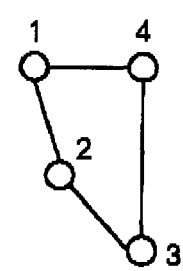
Figure 19C:
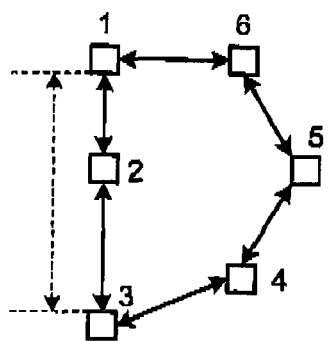

In a pattern layout diagram shown in FIG. 19A, the contact hole patterns 1 and 2, 1 and 4, and 2 and 3 are adjacent at the distance less than the limit distance, and the contact hole patterns 3 and 4 are adjacent at the intermediate pitch. The graph produced from the pattern layout diagram is as shown in FIG. 19B. As well as the nodes 1 and 2, 2 and 3, and 1 and 4, the nodes 3 and 4 are also connected by the edge.

Figure 19D:
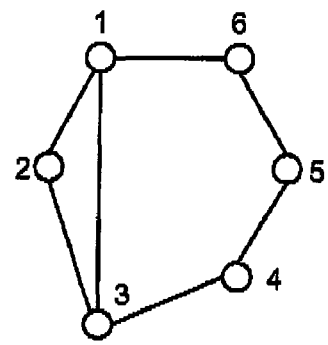

Even when three or more contact hole patterns are laid out on a straight line and the distance between the contact hole patterns at the both ends is the intermediate pitch, an inter-node interval corresponding to the contact hole patterns at the both ends is connected by the edge. In a pattern layout diagram in FIG. 19C, the contact hole patterns 1, 2, and 3 are laid out on a straight line in this order, and the contact hole patterns 1 and 2, and 2 and 3 are adjacent at less than the limit distance. The distance between the contact hole patterns 1 and 3 is the intermediate pitch. FIG. 19D is a graph produced from the pattern layout diagram of FIG. 19C. As shown in FIG. 19D, as well as the nodes 1 and 2, and 2 and 3, the nodes 1 and 3 are also connected by the edge.

Figure 18:
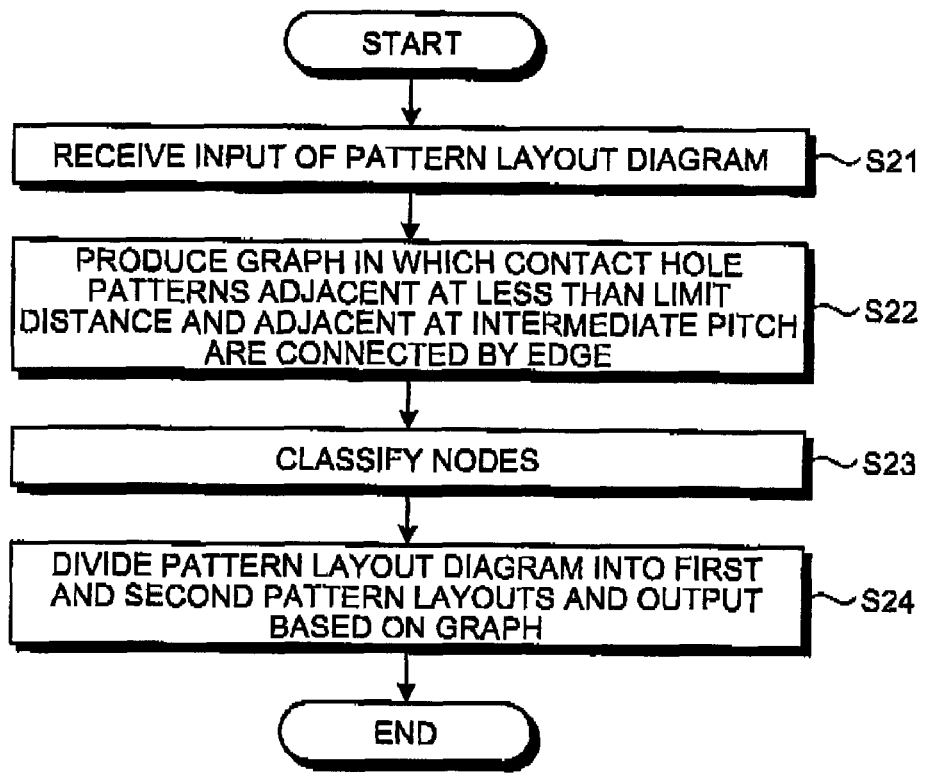
FIG. 18 is a flowchart for explaining an operation of the pattern-layout creating apparatus according to the second embodiment.

FIG. 18 is a schematic diagram for explaining an operation of the pattern-layout creating apparatus 20 according to the second embodiment. First, the pattern-layout input unit 11 receives the pattern layout diagram (Step S21). The graph producing unit 22 regards, as nodes, the contact hole patterns from the pattern layout diagram that the pattern-layout input unit 11 accepts, and produces a graph in which the nodes adjacent at less than the limit distance and the nodes adjacent at the intermediate pitch are connected by the edge (Step S22).

Subsequently, by the operation similar to that at Step S3, the node classifying unit 13 classifies all the nodes into two types so that the nodes at the both ends of the edge belong to types different to each other, based on the graph produced by the graph producing unit 22 (Step S23). Finally, by the operation similar to that at Step S15, the pattern-layout output unit 17 produces the two pattern layout diagrams based on the graph classified into two types, and outputs the same (Step S24).

As described above, according to the second embodiment, the graph in which not only the contact hole patterns adjacent at the distance less than the limit distance, but also the contact hole patterns adjacent at the intermediate pitch are connected by the edge is created, the nodes in the graph are classified, and based on the classification result, the pattern layout diagram is divided. Thus, it is possible to divide the pattern layout diagram into two parts so that a highly accurate pattern can be formed.

However, according to the first embodiment, based on the graph in which the nodes corresponding to the contact hole patterns adjacent at the distance less than the limit distance are connected by the edge, the nodes are classified first, and thereafter, the classification result is corrected so that the number of pairs of nodes (each of which belongs to different groups and is classified into the same type) adjacent at the intermediate pitch is reduced. Therefore, according to the first embodiment, the number of pairs, remaining after the split, of the contact hole patterns adjacent at the distance less than the limit distance is minimum all the time. On the other hand, in the second embodiment, the pair of contact hole patterns adjacent at the distance less than the limit distance and the pair of the contact hole patterns adjacent at the intermediate pitch are not distinguished. Thus, as compared to the first embodiment, it is probable that the number of intermediate pitch pairs remaining after the split is further reduced.

Similar to the first embodiment, the pattern-layout creating apparatus 20 according to the second embodiment can be realized by executing the pattern-layout creating program 6 by a computer having a normal hardware configuration. The hardware configuration of the pattern-layout creating apparatus 20 is the same as that in the first embodiment, and thus explanations thereof will be omitted.

The pattern-layout creating program 6 executed in the pattern-layout creating apparatus 20 according to the second embodiment is configured in a module including each of the constituent elements (the pattern-layout input unit 11, the graph producing unit 22, the node classifying unit 13, and the pattern-layout output unit 17). Each of the constituent elements is loaded on a RAM to produce the pattern-layout input unit 11, the graph producing unit 22, the node classifying unit 13, and the pattern-layout output unit 17 on the RAM.

It is possible to have a configuration such that the pattern-layout creating program 6 executed by the pattern-layout creating apparatus 20 according to the second embodiment is stored in a computer connected to a network such as the Internet, and the program is provided by downloading it via the network. Alternatively, it is also possible that the pattern-layout creating program 6 executed by the pattern-layout creating apparatus 20 is provided or distributed via a network such as the Internet. Further, it is also possible that the pattern-layout creating program 6 according to the second embodiment is incorporated in a ROM or the like in advance and provided to the pattern-layout creating apparatus 20.

Similarly to the first embodiment, the target pattern layout diagram that the pattern-layout creating apparatus 20 according to the second embodiment divides is not limited to a layout diagram of a contact hole pattern.

A pattern-layout creating apparatus according to a third embodiment of the present invention includes not only the configuration of the pattern-layout creating apparatus according to the first or second embodiment, but also an intermediate-pitch calculating device 31 that defines the intermediate pitch.

Figure 20:
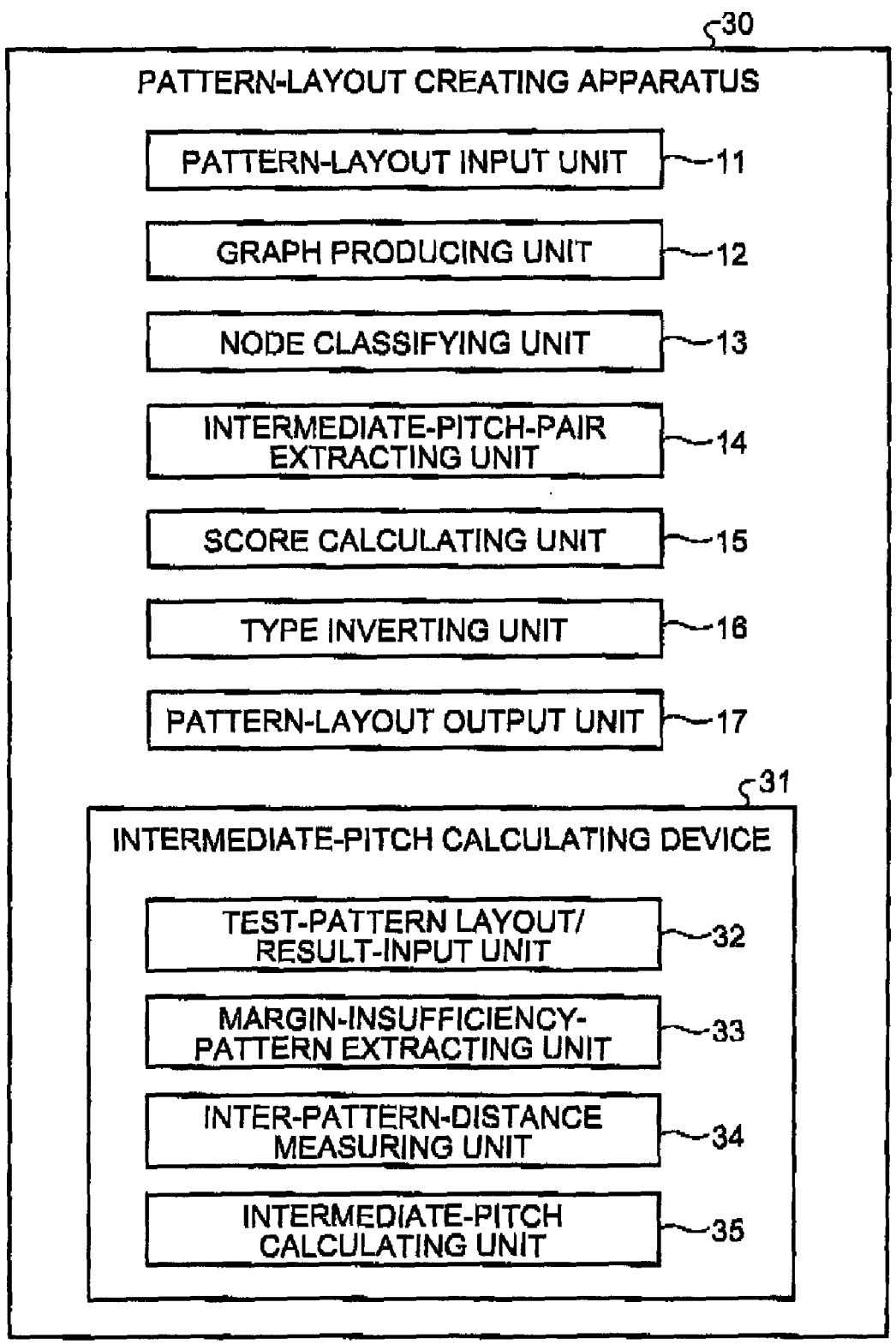
FIG. 20 is a block diagram for explaining a configuration of a pattern-layout creating apparatus according to a third embodiment of the present invention.

FIG. 20 is a block diagram for explaining a configuration of the pattern-layout creating apparatus according to the third embodiment. The pattern-layout creating apparatus 30 shown in FIG. 20 includes not only each of the constituent elements 11 to 17 according to the first embodiment, but also the intermediate-pitch calculating device 31 that defines the intermediate pitch. As the intermediate pitch, an intermediate-pitch-pair extracting unit 14 uses a value defined by the intermediate-pitch calculating device 31.

The pattern-layout creating apparatus 30 according to the third embodiment is configured such that only the intermediate-pitch calculating device 31 is added to the configuration of the pattern-layout creating apparatus 10 according to the first embodiment. Thus, only the intermediate-pitch calculating device 31 is explained below. The pattern-layout creating apparatus 30 can also be configured such that the intermediate-pitch calculating device 31 is added to the configuration according to the second embodiment. In this case, the graph producing unit 22 can use, as the intermediate pitch, the value defined by the intermediate-pitch calculating device 31.

As shown in FIG. 20, the pattern-layout creating apparatus 30 includes: a test-pattern layout/result-input unit 32 that accepts input of an exposure result obtained as a result of being exposed using a test-pattern layout diagram used for calculating the intermediate pitch and a photomask produced based on the test-pattern layout diagram or input of a simulation result obtained as a result of an exposure simulation; a margin-insufficiency-pattern extracting unit 33 that extracts a pattern in which the exposure margin is insufficient from the exposure result or the simulation result that the test-pattern layout/result-input unit 32 accepts; an inter-pattern-distance measuring unit 34 that measures a distance between the exposure-margin insufficient pattern extracted by the margin-insufficiency-pattern extracting unit 33 and a pattern adjacent to this pattern on the photomask based on the test-pattern layout diagram that the test-pattern layout/result-input unit 32 accepts; and an intermediate-pitch calculating unit 35 that calculates an intermediate margin based on a distance measurement result by the inter-pattern-distance measuring unit 34.

Figure 21:
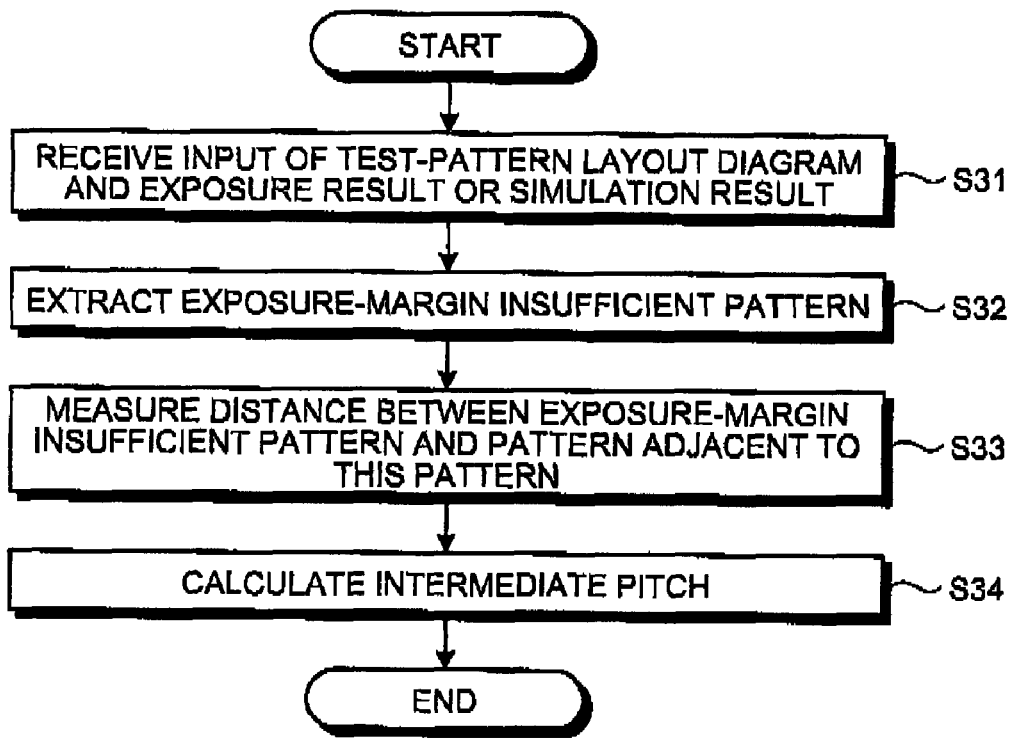
FIG. 21 is a flowchart for explaining an operation of an intermediate-pitch calculating device according to the third embodiment.

The operation of the pattern-layout creating apparatus 30 is described next with reference to FIG. 21, FIG. 22, FIG. 23, FIG. 24, and FIG. 25. FIG. 21 is a flowchart for explaining the operation of the pattern-layout creating apparatus 30.

First, in FIG. 21, the test-pattern layout/result-input unit 32 accepts a test-pattern layout diagram input from an external device or the like, and the exposure result obtained by being exposed using a photomask produced based on this test-pattern layout diagram or a simulation result obtained by an exposure simulation (Step S31). The margin-insufficiency-pattern extracting unit 33 then extracts the pattern in which the exposure margin is insufficient, from the accepted exposure result or exposure simulation result (Step S32).

FIG. 21 is an example of the accepted simulation result. In the simulation result, six obliquely hatched patterns and one vertically hatched pattern in which the exposure margin is insufficient are formed, and this pattern in which the exposure margin is insufficient is extracted.

Subsequent to Step S32, the inter-pattern-distance measuring unit 34 gauges a distance between the extracted pattern in which the exposure margin is insufficient and a pattern adjacent to this pattern in the photomask based on the input test-pattern layout diagram corresponding to the extracted pattern in which the exposure margin is insufficient (Step S33).

Figure 22:
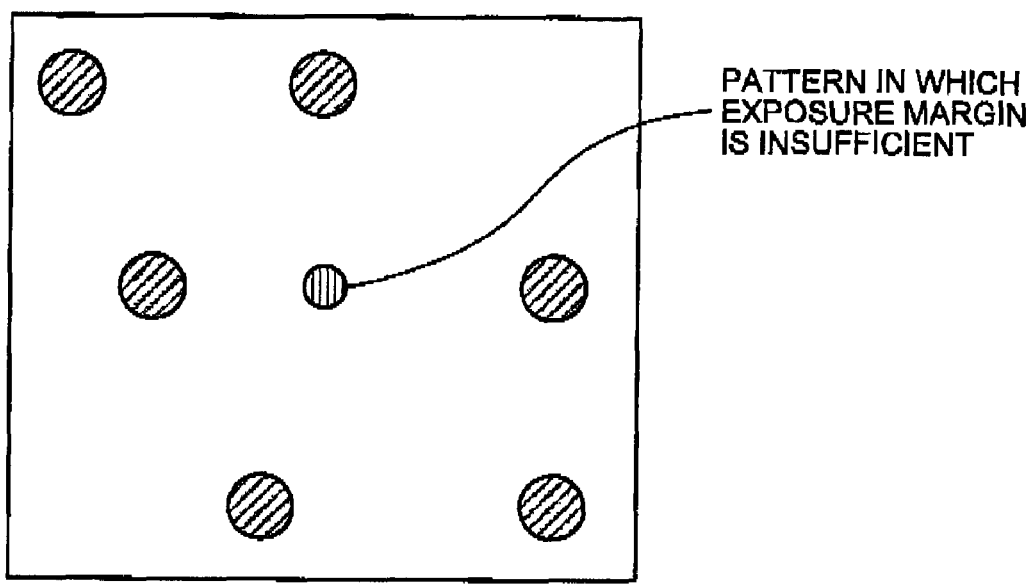
FIGS. 22 to 24 are schematic diagrams for explaining the operation of the intermediate-pitch calculating device according to the third embodiment.
Figure 23:
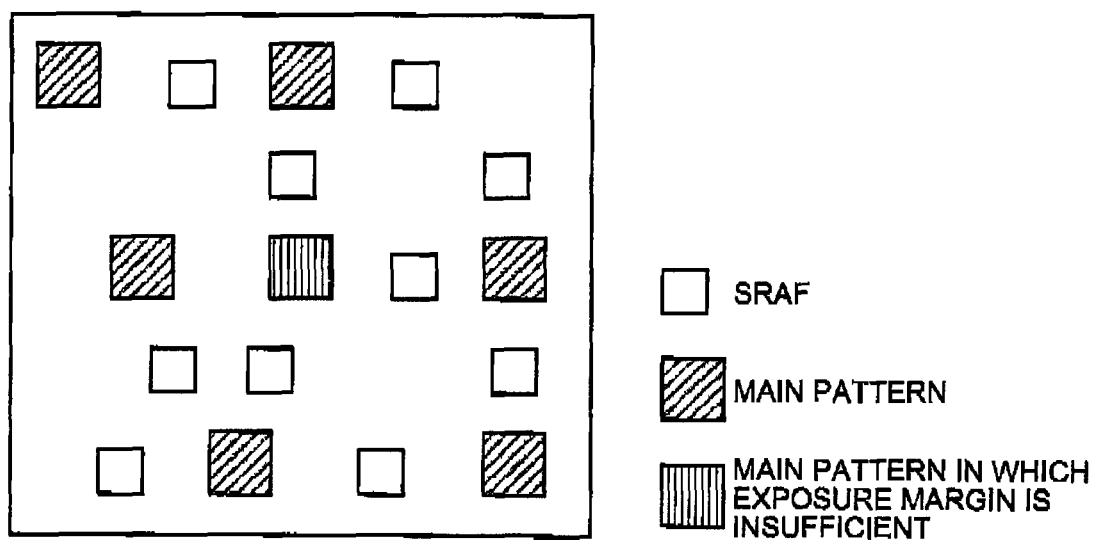

FIG. 23 is an example of the accepted test-pattern layout diagram. As shown in FIG. 23, on the pattern layout diagram, hatched main patterns and SRAF patterns are laid out. The main patterns corresponding to the patterns in which the exposure margin is insufficient in the simulation result shown in FIG. 22 are vertically hatched.

Figure 24:
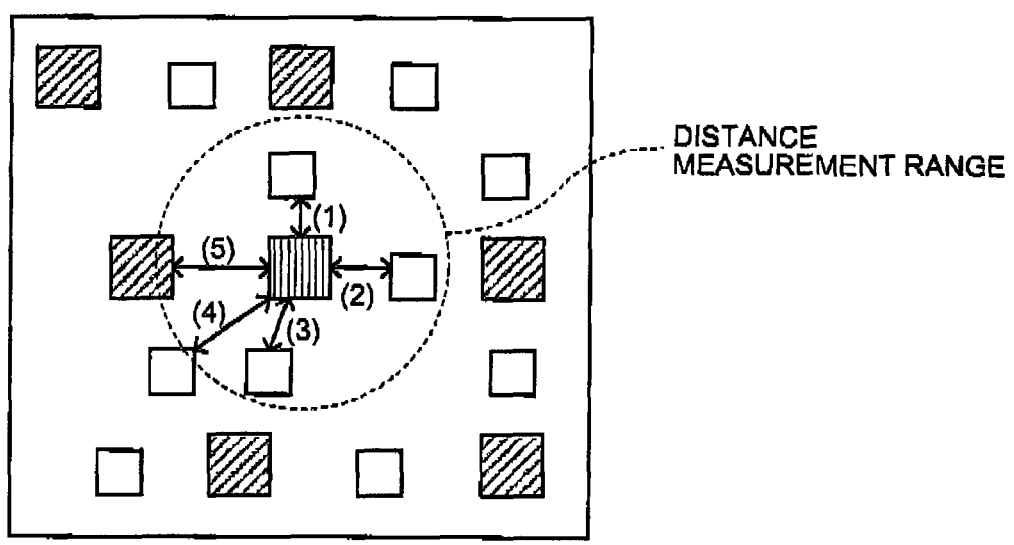

FIG. 24 is a schematic diagram for explaining a part in which the distance is measured at Step S33. As shown in FIG. 24, distances ((1) to (5) in FIG. 24) between the main patterns and the SRAF patterns laid out in a previously set distance measurement range (in this case, the main pattern in which the exposure margin is insufficient is arranged at its center) are measured. The distance measurement range can be set in any preferable way. For example, it can be set equally to a range over which an optical proximity effect affects. When the layout is set so that between one pattern existing in the distance measurement range and the main pattern in which the exposure margin is insufficient, another pattern intervenes, the distance between the patterns can be measured in a manner to cross over the pattern so laid out to be intervened, or the distance measurement that needs to cross over the pattern can be prohibited. Alternatively, in the specific example in FIGS. 22 to 24, there is only one pattern in which the exposure margin is insufficient. However, when there are a plurality such patterns, the distance can be measured about a plurality of patterns in which the exposure margin is insufficient.

Figure 25:
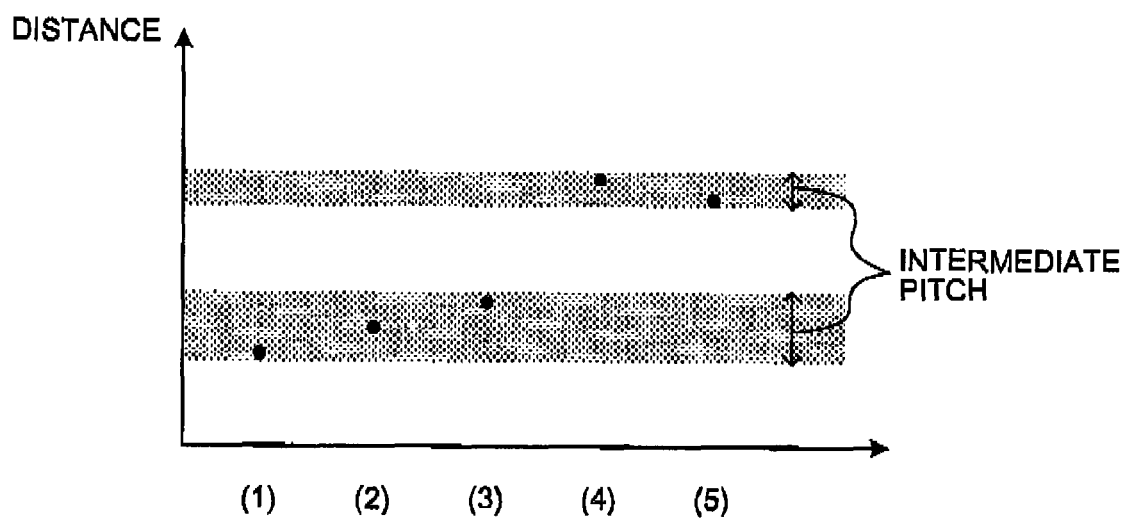
FIG. 25 is a graph for explaining the operation of the intermediate-pitch calculating device according to the third embodiment.

Subsequent to Step S33, the intermediate-pitch calculating unit 35 decides the intermediate pitch based on the distance measurement result (Step S34). As a method of deciding the intermediate pitch, a method of regarding a range that contains the obtained distance measurement result as the intermediate pitch can be selected, for example. FIG. 25 is a schematic diagram for explaining a state where the distance range including the obtained distance measurement result is determined as the intermediate pitch. As shown in FIG. 25, hatched ranges including (1) to (5) are the intermediate pitches. The method of deciding the intermediate pitch is not limited to that described above. For example, a method of regarding, as the intermediate pitch, a range of distances in which a large number of distance measurement results are distributed by at least a certain density can be adopted.

Figure 26:
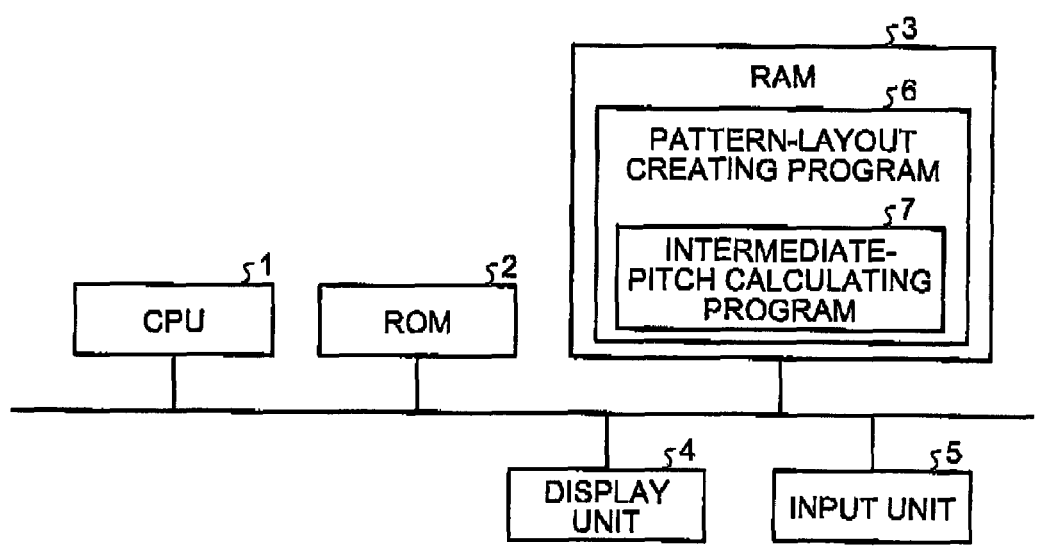
FIG. 26 is a schematic diagram for explaining a hardware configuration of the pattern-layout creating apparatus according to the third embodiment.

The pattern-layout creating apparatus 30 according to the third embodiment can be realized by using a computer having a normal hardware configuration. FIG. 26 depicts a hardware configuration of the pattern-layout creating apparatus 30.

The pattern-layout creating apparatus 30 according to the third embodiment includes the CPU 1, the ROM 2, the RAM 3, the display unit 4, and the input unit 5. In the pattern-layout creating apparatus 30, the CPU 1, the ROM 2, the RAM 3, the display unit 4, and the input unit 5 are connected via a bus line.

The CPU 1 executes the pattern-layout creating program 6 according to the third embodiment loaded in the RAM 3. An intermediate-pitch calculating program 7 is loaded as a part of the pattern-layout creating program 6.

The intermediate-pitch calculating program 7 executed in the pattern-layout creating apparatus 30 according to the third embodiment is configured in a module including each of the constituent elements (the test-pattern layout/result-input unit 32, the margin-insufficiency-pattern extracting unit 33, the inter-pattern-distance measuring unit 34, and the intermediate-pitch calculating unit 35). Each of the constituent elements is loaded on the RAM 3 to produce the test-pattern layout/result-input unit 32, the margin-insufficiency-pattern extracting unit 33, the inter-pattern-distance measuring unit 34, and the intermediate-pitch calculating unit 35 on the RAM 3.

In the above explanations, it is assumed that the intermediate-pitch calculating program 7 is executed as a part of the pattern-layout creating program 6; however, the intermediate-pitch calculating program 7 can be executed independently from the pattern-layout creating program 6. It is also possible that the intermediate-pitch calculating program 7 is stored in a computer connected to a network such as the Internet, and the program is provided by downloading it via the network. Further, it is also possible that the intermediate-pitch calculating program 7 is provided and distributed via a network such as the Internet. It is also possible that the intermediate-pitch calculating program 7 is incorporated in a ROM or the like in advance and provided to the pattern-layout creating apparatus 30.

In the above explanations, the pattern in which the exposure margin is insufficient is extracted and the distance between the pattern and the surrounding area thereof is measured. However, instead of the exposure margin, by using at least one margin out of various conditions relating to a process from the exposure to the pattern transfer, that is, an exposure amount, a focal position, a light-source shape and a light-source intensity, a diffusion length of acid in a resist, development, etching, and mask dimension, the pattern in which the margin is insufficient can be extracted. It is needless to say that regarding the exposure result and the simulation result input to the test-pattern layout/result-input unit 32, it is necessary to select and input the results obtained by undergoing the appropriate process by extracting the pattern based on a margin of which of the various conditions. That is, when the margin relating to etching is used, for example, it is necessary to input a lithography process result including up to a transfer to a semiconductor substrate or a simulation result with which the result is predicted.

As described above, according to the third embodiment, it is configured such that, based on the lithography process result or the simulation result with which the lithography process result is predicted, the pattern in which the process margin is insufficient is extracted from the test-pattern layout diagram, the distance between the extracted pattern and the pattern laid out around this pattern is measured, the intermediate pitch is calculated based on the distance measurement result, and the calculated intermediate pitch is used. As a result, it is possible to use the intermediate pitch defined based on an experiment result or the simulation result. Thus, as compared to the first and second embodiments, it is possible to divide a pattern layout diagram into two parts so that a more accurate pattern can be formed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer-implemented pattern layout creation method comprising:
   producing, by a computer, a graph comprising a plurality of patterns based on a first pattern layout diagram, wherein two patterns adjacent to each other at a distance within a first distance range are connected with each other by an edge;
   classifying, by a computer, each of the plurality of patterns into two types so that two patterns connected by an edge have types different from each other;
   grouping the patterns, by a computer, into a plurality of groups, wherein patterns in each of the groups are connected to each other via edges;
   determining, by a computer, a score for each of the groups, comprising:
      extracting first pairs of patterns, wherein the patterns in each of the first pairs:
         belong to two neighboring groups, respectively;
         are adjacent to each other at a distance within a second distance range; and
         have same type;
      extracting second pairs of patterns wherein the patterns in each of the second pairs:
         belong to two neighboring groups, respectively;
         are adjacent to each other at a distance within a second distance range; and
         have different types; and
      calculating the score for each of the groups by subtracting the number of patterns in the corresponding group that belong to one of the second pairs from the number of patterns in the corresponding group that belong to one of the first pairs, wherein distances in the second distance range are longer than distances in the first distance range;

correcting, by a computer, a classification result by inverting the types of the patterns in the group having a highest score; and dividing, by a computer, the first pattern layout diagram into two second pattern layout diagrams based on the corrected classification result, wherein one of the two second pattern layout diagrams comprises patterns having the first type, and the other one of the two second pattern layout diagrams comprises patterns having the second type.

2. The pattern layout creation method according to claim 1, wherein the determining and correcting steps are repeated until no first pair is left.

3. The pattern layout creation method according to claim 1, wherein:
the first distance range is set so that two patterns adjacent to each other at a distance within the first distance range cannot be transferred and formed in a lithography process by a desired transfer resolution, and
the second distance range is set so that a dummy pattern used for obtaining a desired process margin cannot be arranged for two patterns adjacent to each other at a distance within the second distance range.

4. The pattern layout creation method according to claim 1, further comprising:
extracting a pattern in which a process margin is insufficient from a test-pattern layout diagram based on a lithography process result by the test-pattern layout diagram or a simulation result with which the lithography process result is predicted;
measuring a distance between the extracted pattern in which a process margin is insufficient and a pattern laid out around the extracted pattern; and
calculating the second distance range based on a result obtained by the distance measurement.

5. A non-transitory computer-readable storage medium storing instructions, which, when executed, cause a computer to:
produce a graph comprising a plurality of patterns produced based on a first pattern layout diagram, wherein two patterns adjacent to each other at a distance within a first distance range are connected with each other by an edge;
classify each of the patterns into two types so that two patterns connected by an edge have types different from each other;
group the patterns into a plurality of groups, wherein patterns in each of the groups are connected to each other via edges;
determine a score for each of the groups, comprising:
extracting first pairs of patterns, wherein the patterns in each of the first pairs:
belong to two neighboring groups, respectively;
are adjacent to each other at a distance within a second distance range; and
have same type;
extracting second pairs of patterns, wherein the patterns in each of the second pairs:
belong to two neighboring groups, respectively;
are adjacent to each other at a distance within a second distance range; and
have different types; and
calculating the score for each of the groups by subtracting the number of patterns in the corresponding group that belong to one of the second pairs, from the number of patterns in the corresponding group that belong to one of the first pairs,
wherein distances in the second distance range are longer than distances in the first distance range;
correct a classification result by inverting the types of the patterns in the group having a highest score; and
divide the first pattern layout diagram into two second pattern layout diagrams based on the corrected classification result, wherein one of the two second pattern layout diagrams comprises patterns having the first type, and the other one of the two second pattern layout diagrams comprises patterns having the second type.

6. The storage medium according to claim 5, wherein the instructions further cause the computer to repeat the determining and correcting steps until no first pair is left.

7. The storage medium according to claim 5, wherein:
the first distance range is set so that two patterns adjacent to each other at a distance within the first distance range cannot be transferred and formed in a lithography process by a desired transfer resolution, and
the second distance range is set so that a dummy pattern used for obtaining a desired process margin cannot be arranged for two patterns adjacent to each other at a distance within the second distance range.

8. The storage medium according to claim 5, wherein the instructions further cause the computer to:
extract a pattern in which a process margin is insufficient from a test-pattern layout diagram based on a lithography process result by the test-pattern layout diagram or a simulation result with which the lithography process result is predicted;
measure a distance between the extracted pattern in which a process margin is insufficient and a pattern laid out around the extracted pattern; and
calculate the second distance range based on a result obtained by the distance measurement.

9. A semiconductor device manufacturing method comprising:
producing, by a computer, a graph comprising a plurality of patterns produced based on a first pattern layout diagram, wherein two patterns adjacent to each other at a distance within a first distance range are connected with each other by an edge;
classifying, by a computer, each of the patterns into two types so that two patterns connected by an edge have types different from each other;
grouping, by a computer, the patterns into a plurality of groups, wherein patterns in each of the groups are connected to each other via edges;
determining, by a computer, a score for each of the groups, comprising:
extracting first pairs of patterns, wherein the patterns in each of the first pairs:
belong to two neighboring groups, respectively;
are adjacent to each other at a distance within a second distance range; and
have same type;
extracting second pairs of patterns, wherein the patterns in each of the second pairs:
belong to two neighboring groups, respectively;
are adjacent to each other at a distance within a second distance range; and
have different types; and
calculating the score for each of the groups by subtracting the number of patterns in the corresponding group that belong to one of the second pairs from the number of patterns in the corresponding group that belong to one of the first pairs, wherein distances in the second distance range are longer than distances in the first distance range;

correcting a classification result by inverting the types of the patterns in the group having a highest score;

dividing, by a computer, the first pattern layout diagram into two second pattern layout diagrams based on the corrected classification result, wherein one of the two second pattern layout diagrams comprises patterns having the first type, and the other one of the two second pattern layout diagrams comprises patterns having the second type; and forming the patterns on a semiconductor substrate based on the second pattern layout diagrams.

* * * * *